US010554538B2

(12) United States Patent
Spohn et al.

(10) Patent No.: US 10,554,538 B2
(45) Date of Patent: Feb. 4, 2020

(54) DYNAMIC LINK STATE ROUTING PROTOCOL

(71) Applicant: ADARA NETWORKS, INC., San Jose, CA (US)

(72) Inventors: Marcelo Spohn, Porto Alegre (BR); Raghu Gangi, Dublin, CA (US)

(73) Assignee: ADARA NETWORKS, INC., San Jose, CA (US)

(*) Notice: Subject to any disclaimer, the term of this patent is extended or adjusted under 35 U.S.C. 154(b) by 0 days.

(21) Appl. No.: 15/702,583

(22) Filed: Sep. 12, 2017

(65) Prior Publication Data
US 2019/0081884 A1    Mar. 14, 2019

(51) Int. Cl.
*H04L 12/24* (2006.01)
*H04L 12/26* (2006.01)
(Continued)

(52) U.S. Cl.
CPC ............ *H04L 45/123* (2013.01); *H04L 41/12* (2013.01); *H04L 43/08* (2013.01); *H04L 43/10* (2013.01); *H04L 43/103* (2013.01); *H04L 43/106* (2013.01); *H04L 43/50* (2013.01); *H04L 45/02* (2013.01); *H04L 45/12* (2013.01); *H04L 45/121* (2013.01); *H04L 45/122* (2013.01);
(Continued)

(58) Field of Classification Search
CPC . H04L 41/12; H04L 43/08–106; H04L 43/50; H04L 45/02–028; H04L 45/12–1287; H04L 45/26; H04L 45/48; H04L 45/70; H04L 63/06–061
See application file for complete search history.

(56) References Cited

U.S. PATENT DOCUMENTS 7,324,553 B1    1/2008 Varier et al.
7,584,298 B2 *  9/2009 Klinker .................. H04L 43/00
                                                370/229
(Continued)

FOREIGN PATENT DOCUMENTS

EP    1440529 B1    8/2016

OTHER PUBLICATIONS

PCT International Search Report for PCT/US2018/050765 dated Nov. 30, 2018.
(Continued)

*Primary Examiner* — Timothy J Weidner
(74) *Attorney, Agent, or Firm* — Womble Bond Dickinson (US) LLP

(57) ABSTRACT

A router and methods for routing packets in a network are described. The router and methods are implemented with a dynamic link state routing protocol (DLSP). The router dynamically computes a best path from one or more paths by periodically probing links of peer nodes to determine link metrics associated with a link. The one or more link metrics include a link bandwidth to a peer node and a link latency to the peer node. Further, the router can dynamically recalculate the one or more link metrics associated with the link every 10 seconds. The router can also monitor one or more link state changes based on the one or more link metrics, wherein the link state changes are monitored every 60 second. The router can further determine a single link metric based on the link bandwidth to the peer node and the link latency to the peer node.

37 Claims, 13 Drawing Sheets

1200

| Link (Tunnel) Number | IP Source Address | IP Destination Address | Link Latency | Link Bandwidth | Error Rate | Load Distribution (%) | Cost | Hops |
|---|---|---|---|---|---|---|---|---|
| L12 | | | | | | | | |
| L13 | | | | | | | | |
| ... | | | | | | | | |

(51) Int. Cl.
| | |
|---|---|
| H04L 12/721 | (2013.01) |
| H04L 12/727 | (2013.01) |
| H04L 12/729 | (2013.01) |
| H04L 12/733 | (2013.01) |
| H04L 12/751 | (2013.01) |
| H04L 29/06 | (2006.01) |

(52) U.S. Cl.
CPC .......... *H04L 45/124* (2013.01); *H04L 45/125* (2013.01); *H04L 45/70* (2013.01); *H04L 63/06* (2013.01); *H04L 63/061* (2013.01)

(56) References Cited

U.S. PATENT DOCUMENTS

| | | | | |
|---|---|---|---|---|
| 7,706,300 | B2* | 4/2010 | Norrgard | H04L 41/0213 370/254 |
| 8,260,922 | B1* | 9/2012 | Aggarwal | H04L 45/24 709/226 |
| 9,461,905 | B2* | 10/2016 | Schrecke | H04L 43/0894 370/253 |
| 2012/0128000 | A1 | 5/2012 | Baillargeon et al. | |

OTHER PUBLICATIONS

PCT Written Opinion of the International Searching Authority for PCT/US2018/050765 dated Nov. 30, 2018.

S. Baillargeon, C. Flinta, A. Johnsson, Ericsson, "Ericsson Two-Way Active Measurement Protocol (TWAMP) Value-Added Octets", Internet Engineering Task Force (IETF), ISSN: 2070-1721, Category: Informational, Nov. 2012, pp. 1-16.

A. Siddiqui, D. Romascanu, Avaya, E. Golovinsky, Alert Logic, "Real-time Application Quality-of-Service Monitoring (RAQMON) Framework", Network Working Group, Category: Standards Track, Oct. 2006, pp. 1-36.

K. Hedayat, Brix Networks, R. Krzanowski, Verizon, A. Morton AT&T Labs, K. Yum, Juniper Networks, J. Babiarz, Nortel Networks, , A Two-Way Active Measurement Protocol (TWAMP), Network Working Group, Category: Standards Track, Oct. 2008, pp. 1-26.

Bang Ye Wu, Kun-Mao Chao, "Shortest-Paths Trees", pp. 1-15, An excerpt from the book "Spanning Trees and Optimization Problems," by Bang Ye Wu and Kun-Kao Chao, 2004, Chapman & Hall/CRC Press, USA.

Nick McKeown, Guru Parulkar, Scott Shenker, Tom Anderson, Larry Peterson, Hari Balakrishnan, Jennifer Rexford, Jonathan Turner, "OpenFlow: Enabling Innovation in Campus Networks", Mar. 14, 2008, 6 pages.

IP SLAs Configuration Guide, Cisco IOS XE Release 3S, First Published Nov. 5, 2012, 356 pages, downloaded from http://cisco.com/c/en/us/td/docs/ios-xml/ios/ipsla/configuration/xe-3s/sla-xe-3s-book/sla_twamp.html on Apr. 4, 2019.

TWAMP Explained, Measuring Performance in IP Networks, Sep. 2014, 10 pages, downloaded from https://www.slideshare.net/nirc1963/what-istwamp on Apr. 4, 2019.

* cited by examiner

| Link (Tunnel) Number | IP Source Address | IP Destination Address | Link Latency | Link Bandwidth | Error Rate | Load Distribution (%) | Cost | Hops |
|---|---|---|---|---|---|---|---|---|
| L12 | | | | | | | | |
| L13 | | | | | | | | |
| ... | | | | | | | | |

FIG. 12

DYNAMIC LINK STATE ROUTING PROTOCOL

FIELD

Embodiments relate to networking, and more particularly, to a dynamic link state protocol for routing data packets on a network.

BACKGROUND

A router is a device that forwards data packets between computer networks, creating an overlay internetwork. A data packet is forwarded from one router to another through the networks that constitute the internetwork until it gets to its destination node. Routers on the internet may control traffic.

To meet the demand of decreasing network congestion and issues involved with data centers, modern routers may use one or more routing protocols to aid traffic. Currently, most of the routing protocols are associated with cloud computing and common software-defined networking (SDN). The major problem associated with cloud computing is that the existing systems are static. Existing cloud computing systems can monitor, measure, and report, but the systems are hindered when dealing with thousands of dynamic, real-time responses received from multiple nodes. As such, other problems associated with cloud computing are the extensive handling requirements involved, which typically include handling an automatic increase in computing resource supplies as computing demand increases.

Likewise, a typical SDN also has several problems. The typical SDN generally is also static and lacks a dynamically automated topology database. For example, most of the industry recognized SDNs stop at the virtual machine (VM) layer. As such, SDNs are limited when extending to application and service layers, as well as virtual and physical infrastructures. Accordingly, most of the SDNs involve elaborate applications for monitoring and configuring at the application and services layers, which are typically expensive and time-consuming to implement.

SUMMARY

Embodiments described herein relate to methods and systems of routing packets over a link in a network between nodes based on a dynamic link state protocol (DLSP).

Embodiments described herein relate to a method for routing packets on a network. According to some embodiments, the method includes dynamically computing a best path from one or more paths by periodically probing links of peer nodes to determine one or more link metrics associated with a link, where the one or more link metrics include a link bandwidth to a peer node and a link latency to the peer node. According to some embodiments, the method further includes dynamically recalculating the one or more link metrics associated with the link every 10 seconds, monitoring one or more link state changes based on the one or more link metrics, wherein the link state changes are monitored every 60 seconds, and determining a single link metric based on the link bandwidth to the peer node and the link latency to the peer node.

Embodiments described herein relate to a router for routing packets on a multipath network. According to some embodiments, the router includes a memory, and a processing unit coupled to the memory, where the processing unit determines one or more links associated with one or more paths, where each of the one or more links transmits one or more packets between peer nodes, dynamically computes a best path from the one or more paths by periodically probing the one or more links of the peer nodes, and determines one or more link metrics associated with each of the one or more probed links, where the one or more link metrics include a link bandwidth to a peer node and a link latency to the peer node. According to some embodiments, the router further includes one or more link metrics associated with the link are dynamically recalculated every 10 seconds, one or more link state changes are monitored based on the one or more link metrics, wherein the link state changes are monitored every 60 seconds, and a single link metric is determined based on the link bandwidth to the peer node and the link latency to the peer node.

Embodiments described herein relate to a method for routing packets on a multipath network. According to some embodiments, the method includes determining one or more links associated with one or more paths, where each of the one or more links transmits one or more packets between peer nodes, dynamically computing a best path from the one or more paths by periodically probing the one or more links of the peer nodes, and determining one or more link metrics associated with each of the one or more probed links, where the one or more link metrics include a link bandwidth to a peer node and a link latency to the peer node. According to some embodiments, the method further includes dynamically recalculating the one or more link metrics associated with the link every 10 seconds, monitoring one or more link state changes based on the one or more link metrics, where the link state changes are monitored every 60 seconds, and determining a single link metric based on the link bandwidth to the peer node and the link latency to the peer node.

Other objects, features, and advantages will be apparent from the accompanying drawings and from the detailed description that follows.

BRIEF DESCRIPTION OF THE DRAWINGS

Embodiments described herein illustrated by way of example and not limitation in the figures of the accompanying drawings, in which like references indicate similar features. Furthermore, some conventional details have been omitted so as not to obscure from the inventive concepts described herein.

FIG. 12 is a table illustrating one or more parameters that are computed using a DLSP system, according to one embodiment.

DETAILED DESCRIPTION

Figure 1:
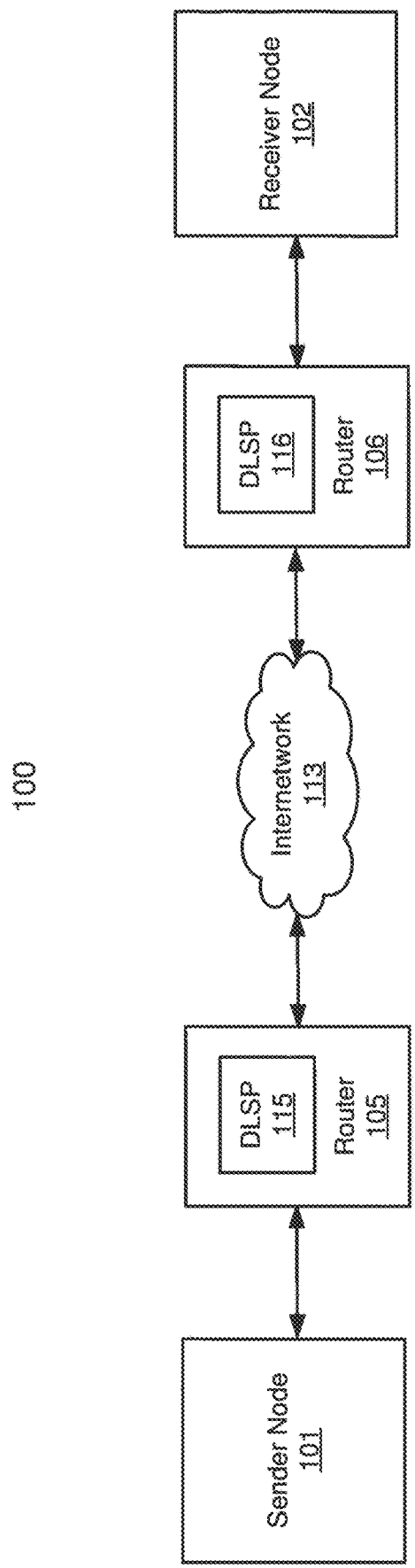
FIG. 1 is a block diagram of a dynamic link state protocol (DLSP) system used to route packets in a network using a unicast transmission, according to one embodiment.

Described below are systems and methods of routing packets based an a dynamic link state protocol (DLSP). For one embodiment, the DLSP system routes packets (also referred to as data packets) on a network, where the DLSP system in real-time dynamically computes a path (also referred to as a cost of a path) by periodically probing links of peer nodes to determine link metrics for each link. Each link has at least two link metrics that are dynamically computed including a link bandwidth of a peer node (or a neighbor node) and a link latency to the peer node. Further, for one embodiment, the DLSP system re-computes the link metrics approximately every 10 seconds and monitors for changes in a link state approximately every 60 seconds.

Embodiments of the DLSP system enable real-time performance-based cloud computing and networking through cloud computing and software-defined networking (SDN) applications. In addition, embodiments of the DLSP system enable automated bare metal server and virtual machine discovery, attachment and provisioning, and auto-configuration (or auto-discovery) of DLSP nodes (e.g., routers/switches). Embodiments of the DLSP system provide a dynamic (or real-time) routing protocol that enables auto-configuration in any network topology by periodically monitoring change(s) to link state(s) of one or more nodes (i.e., the link connectivity between a node and its neighbor/peer nodes). Moreover, embodiments of the DLSP system also provide a dynamic routing protocol that enables event-based (e.g., a link failure) auto re-configuration to any node, host, or topology in response to any changes in the nodes (e.g., performance, topological, or infrastructure changes).

Embodiments of the DLSP system enable auto-virtual machine (auto-VM) migration and concurrent auto-provisioning of both an overlay (or virtual) network and an underlay (or physical network) based on real-time DLSP computed network state and performance. For example, the DLSP system helps to drastically reduce network congestion and data centers issues created by elephant flows that result from static (i.e., unintelligent or non-dynamic) VM migration schemes. Further, embodiments of the DLSP system help to provide a controller (e.g., a DLSP enabled controller, router, switch, or node) that facilitates (i) virtual/physical port modification, (ii) auto-recognition of node statuses (e.g., faulty links, link failures, broken/delayed links, etc.), and (iii) auto-generation of rules based on real-time DLSP computed network performance that are established upon one or more link metrics—including link latency, link utilization, link bandwidth, link quality, and any other definable metrics associated with both packet and optical systems.

As such, embodiments of the DLSP system enable "intelligent" or real-time routing protocols by dynamically computing a best path (or a lowest cost path) from multipaths in a network onto a topology database based on link capacity. The link capacity may be computed by periodically probing links to determine a path latency (summation of latency of links for a path) and a path bandwidth (or a minimum inter-arrival time (IAT) found for a link on the path). Accordingly, a DLSP method and/or system for routing packets in a network (e.g., a unicast, a multicast, a multipath, or a satellite communications (SATCOM) network) help to find the best path or the lowest cost path, which will result in greater efficiency in any network.

FIG. 1 illustrates a DLSP system 100 to route packets in an internetwork 113 using a unicast transmission. For one embodiment, the DLSP system 100 includes network devices, e.g., a sender node 101 (or an endpoint device) that can act as a source device to transmit packets, one or more routers 105-106 (also referred to as nodes, switches, or peer/neighbor nodes) to forward the packets along a network path, and a receiver node 102 (or another endpoint device) that can act as a destination device to receive the packets.

As shown in FIG. 1, the DLSP system 100 may be used in a unicast transmission (or a one-to-one transmission) that enables routing/forwarding of packets from one endpoint in a network to another endpoint via a network path (hereinafter referred to as a "path"). For one embodiment, the path includes an internetwork 113 that includes a plurality of routers (e.g., routers 105-106) that forward packets along a plurality of paths (e.g., the Internet). In addition, FIG. 7 also illustrates a process flow, as described herein, for routing packets in a network using the unicast transmission protocol, such as a DLSP 115

For one embodiment, routers 105-106 create an overlay network along the path. For example, a router (e.g., router 105) may be connected to data paths from a plurality of networks. Generally, when a data packet (hereinafter referred to as a "packet") comes on a data path, the router reads the address information in the packet to determine its destination (e.g., receiver node 102). Then, using information from a routing table (or a topology database) stored in a memory, the router can forward the packet to a next network via node(s) until the packet reaches its destination. Generally, the router can set a static policy as to how much bandwidth a given set of traffic is allowed to have. If the traffic presented is over those limits, the router begins to drop traffic of packets or switch the traffic of the packets.

Routers (e.g., routers 105-106) implemented with DLSP (e.g., DLSP 115-116) can set one or more dynamic policies as to a priority-based link, an Internet Protocol (IP) source address, an IP destination address, a link latency, a link bandwidth (e.g., a maximum bandwidth and/or an available bandwidth), an error rate link, a link capacity, a link quality, a load ratio, and any other definable link metric (as described in further detail below).

For some embodiments, all the routers (nodes) and neighbors (neighbor nodes) in the network are interconnected to send packets from one host (e.g., receiver node 101) to another host (e.g., sender node 102). For example, a host can be a client or a server depending on what role it is serving.

As illustrated in FIG. 1, routers 105-106 are implemented with DLSP 115-116 to dynamically compute a path by periodically probing for link state information of peer nodes, as described herein. A topology database may be periodically updated with link state information obtained/monitored through links with peer nodes (or neighbor nodes), where each link has at least two link metrics (e.g., link latency and link bandwidth). The link state information may be monitored by a DLSP-enabled router, such as router 105 and router 106.

As used herein, "nodes" may refer to routers, controllers, switches, and/or hosts (e.g., senders or receivers) in a network. Further, as illustrated in FIGS. 1-6, "nodes" in the network can be implemented with a routing protocol such as DLSP (i.e., DLSP-enabled nodes) and be thought of as being connected by virtual or logical links, where each link corresponds to a path (perhaps through many physical links) in the underlying network.

As used herein, "DLSP" may refer to a routing protocol that routes packets on a network via one or more nodes. "DLSP" may also refer to a routing protocol that at real-time dynamically computes a path by periodically probing links of peer nodes to determine link metrics for each link, including a link bandwidth of a peer node (or a neighbor node) and a link latency to the peer node. The DLSP may be, but is not limited to, a unicast, a multipath, and a multicast routing protocol, or any other transmission/routing protocol. Further, as used herein, a "DLSP system" (or a DLSP network) may refer to a packet switching network that uses DLSP, implementing a dynamic process that computes multipaths from a source (e.g., sender node 101) to a destination (e.g., receiver node 102) in the network. The DLSP system may be used to determine a best path by dynamically computing multipaths onto a topology database based on link state information (or lint edge capacity). For one embodiment, the link state information may be the product of links with IATs of packets to find a best path, where computing the best path (or the lowest cost path) will result in greater efficiency in the DLSP system (e.g., eliminating network congestion issues).

The topology database is updated with link state information of the peer nodes, such as link latency and link bandwidth, traveling on a path. The DLSP system may use link state information of the path to determine a cost of a path (or a sequence of links). As described in further detail below, the cost of the path may be computed by determining the summation of the link capacity of each link on the path (i.e., determining a physical path, one or more paths with qualifying load ratios, and a path of last resort).

The DLSP may be used to periodically probe peer nodes in the network and to efficiently update the topology database, for example, by only providing those link state changes to the topology database that exceed a given value. For example, the DLSP is used to populate the topology database with link state information obtained from neighbor/peer nodes (or routers). For some embodiments, the link state information that is obtained from nodes will be used to partially advertise link state information to the other peer nodes (e.g., if the given value is exceeded).

For some embodiments, the DLSP (e.g., DLSP 115) of a node (e.g., router 105) sends routing update messages to peer node(s) (e.g., router 106) that convey the state of links maintained on the topology database. When DLSP establishes a new link with a peer node (a new neighbor), the node will send link state information to the new peer node. When the node updates a link state, the node will then assign a new link state sequence number. The DLSP will accordingly replace a previous lower value of the link state. For one embodiment, this changed link state information may only be shared with those nodes in the topology database that are part of the Shortest Path Tree ("SPT"), as described in further detail below. For another embodiment, after computation of the SPT, the DLSP may select to only report to its peer nodes incremental changes to the SPT and update messages such as link failures. Accordingly, advantages to the embodiments described herein are that by periodically monitoring link state changes (e.g., link bandwidth and link latency) and forwarding link state updates to peer nodes, the DLSP (e.g., DLSP 115-116) enables the DLSP system (e.g., DLSP system 100) in real-time to (i) auto-configure each of its peer nodes within any network topology, and (ii) find the best path to improve efficiency in the network. Note that the DLSP system 100 as shown in FIG. 1 can include one or more additional components which will be described in further detail below.

Figure 2:
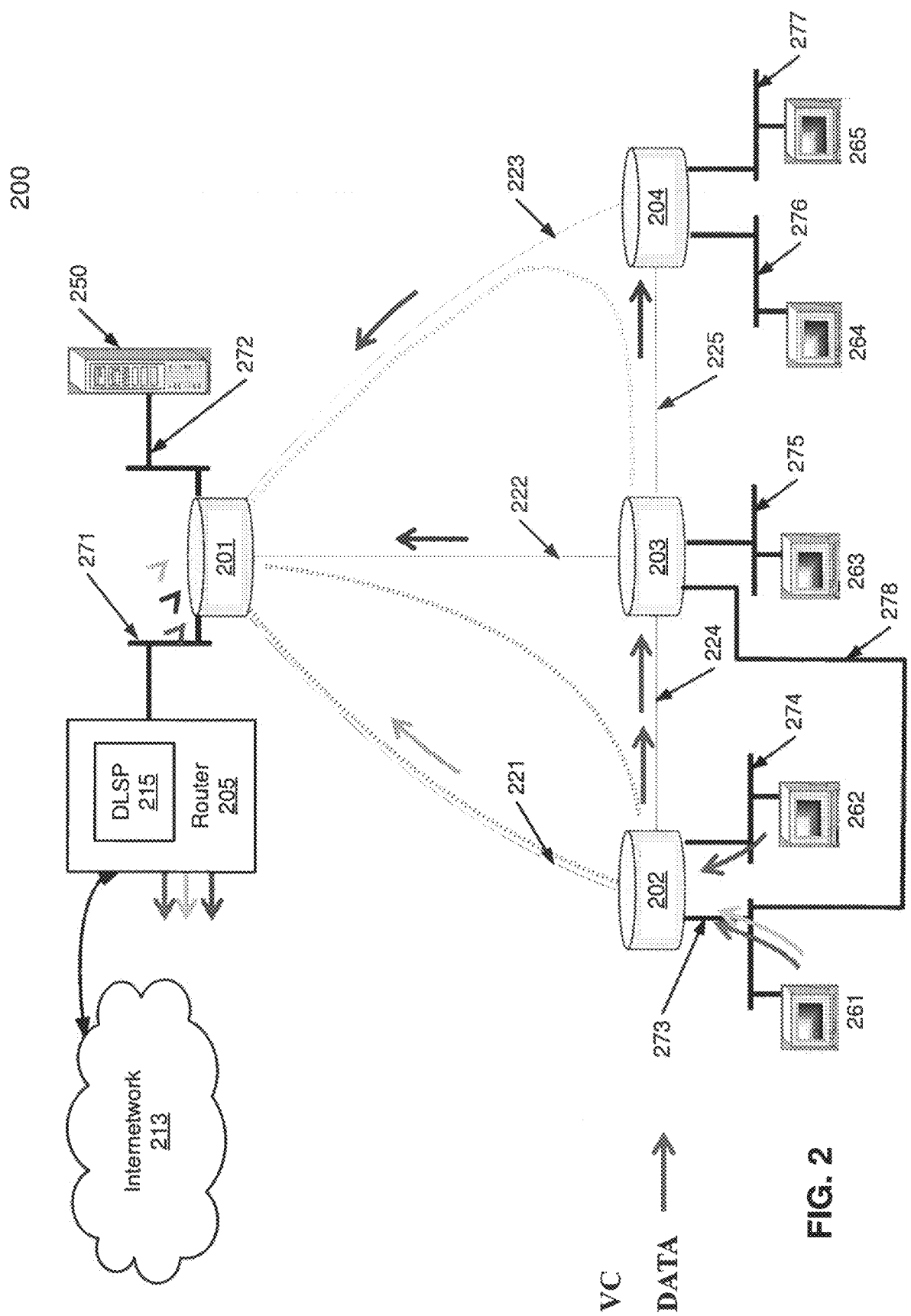
FIG. 2 is a block diagram of a DLSP system used to route packets in a network using a multipath transmission, according to one embodiment.

FIG. 2 illustrates a DLSP system 200 routing packet(s) (e.g., a single latency probe, a packet train, etc.) in an internetwork 213 (e.g., Internet) using a multipath routing protocol (or multipath transmission), such as DLSP 215. The DLSP system 200 as shown in FIG. 2 is similar to the DLSP system 100 of FIG. 1. In addition, FIG. 8 also illustrates a process flow, as described herein, for routing packets in a network using the multipath routing protocol, such as the DLSP 215.

For one embodiment, as shown in FIG. 2, the multipath routing protocol may use multiple alternative paths (also referred to as tunnels) through the DLSP system/network 200. This can yield a variety of benefits to the DLSP system 200 such as: (i) periodic encryption and authentication of packets to improve security, (ii) dynamic computing/monitoring links to nodes to determine a best path (increasing overall network efficiency), (iii) real-time updates and reconfigurations of nodes, (iv) dynamic discovery of new peer/neighbor nodes, and (v) fault tolerance.

For one embodiment, the DLSP system 200 includes one or more network devices, e.g., nodes 201-204 (or modules) that each can act as a source device (or a multipath sender host) to transmit packets, a destination device (or a multipath receiver host) to receive the packets, and/or any other routing device (e.g., a switch, a controller, a router, a module, a kernel, etc.). For some embodiments, each of the network devices can forward the packets along a link (e.g., links 221-225) in a path, and then change (or re-route) the packets to another link in the path based on the DLSP, as described herein. Note that each of the nodes 201-204 (as shown in FIG. 2) may be implemented as a module (or kernel). For example, when loaded into a memory, each of the modules reside at the kernel mode level of the operating system (OS) to enable and enforce a set of configurable policies used to determine a best path on the network.

Further, as shown in FIG. 2, the DLSP system 200 shows a network topology that includes a router 205 having DLSP 215, one or more nodes 201-204 (e.g., routers implemented with DLSP-enabled kernels/modules) connected by paths or tunnels 221-225, server 250, and one or more hosts 261-265. Note that a host can typically be a client machine (as shown in FIG. 2) or a server depending on what role it is serving.

For some embodiments, node 201 has server 250 and router 205 connected through one or more networks 271-272 (e.g., Ethernet networks). The other nodes 202-204 have hosts 261-265 (e.g., client machines) connected to one or more networks 273-278 (e.g., Ethernet networks). As shown in FIG. 2, the DLSP system 200 further includes transmitting packets over (i) virtual circuits (VCs) that are illustrated as dotted lines and (ii) data transmissions that are illustrated as solid lines with arrows. Note that VCs are described in further detail below.

According to some embodiments, the hosts 261-265 may place one or more flow control requests (e.g., a Transmission Control Protocol (TCP), a HyperText Transfer Protocol (HTTP), etc.) to the DLSP-enabled router 205 and the server 250 via node 201.

As described herein, a "link" refers to a physical and logical network component used to interconnect hosts or nodes in a network. Accordingly, as described herein, a "path" (also referred to as a tunnel) refers to one or more links used to interconnect hosts or nodes in a network, where the "path" is a sequence of links used to route packets between two or more nodes (or hosts). Further, a "best path" (also referred to as a lowest cost path) refers to computing a path based on multipaths (or one or more paths) to determine whether one path should be chosen over other paths.

A router (or a node) may determine the "best path" based on a DLSP (e.g., DLSP 215) that uses link metrics to make routing decisions. For example, DLSP uses several link metrics, such as link latency and link bandwidth, to dynamically determine the best path by periodically probing multiple links that are connected to peer nodes of the network. As such, the packets will be routed in the direction (or sequence) of the link(s) with the lowest metric (e.g., the direction with the lowest metric can be a default best path).

As used herein, "link metrics" refer to any number of values that help the router determine the best path (or lowest cost of the path) among multiple paths to a destination in a network. For example, the router (e.g., router 205) uses DLSP (e.g., DLSP 215) to dynamically determine a path based on a link metric that combines (i) a bandwidth of a link to a peer node and (ii) a latency of the link to the peer node. For some embodiments, the link metrics of the DLSP system (e.g., DLSP system 200) may also include other link state information such as, but not limited to, load ratios (or load distributions), error rates, hop counts, path costs, and jointedness.

For some embodiments, the DLSP system 200 may use links 221-225 interconnected to nodes 201-204 to route packets in a path based on multiple paths. For one embodiment, the DLSP system 200 can dynamically compute a path based on a physical path, one or more paths with qualifying load ratios, and a path of last.

According to one embodiment, each of the nodes (e.g., nodes 201-205) dynamically computes (e.g., recomputed every 10 seconds) a physical path to route the packets. For one embodiment, the physical path is determined based on a shortest path tree (SPT) (i.e., a shortest path first) with vertex I as the root. Vertex I can be any transmitting/sender node, such as node 201, that has at least two links (e.g., links 221-222) to transmit data packets to reach a receiving node (e.g., client node 261). As such, vertex I may be used when a node (e.g., node 201) is determining a SPT between one or more nodes.

For example, if using four nodes (e.g., nodes 201, 202, 203, and 261) to compute the SPT (to simplify the description), vertex I can be illustrated as node 201, where I can be denoted as links 221 (between node 201 and node 202) to link 222 (between node 201 and node 203) (i.e., vertex I=221-222). The remaining links of the tree are a first link 224 between node 202 and 203, a second link 273 between node 202 and node 261, and a third link 278 between node 203 and 261. Continuing with the example, each of the links has the same capacity when computing the SPT from vertex I to node 261 at the beginning. Based on the available physical paths (e.g., link 222 connected to link 278, link 221 connected to link 273, etc.), the path cost is determined based on the summation of the capacity of the links on the path.

Subsequently, a shortest path risk N−1 for each peer node of vertex I is computed, where the value of N is the highest degree found for a vertex when you compute the shortest path to zero routed on vertex I. Note that the total vertex will be equal to the number of links (or edges) to reach zero, and N−4 (SPT) having peer k (e.g., nodes 202-203) at the root (i.e., k of vertex I). Accordingly, the link capacity of the links is determined based on the difference between the root of nodes of the tree. The first SPT at peer k will have the lowest path cost compared to the other paths (e.g., if you have two trees on the route to k, the path cost to the destination will be lower than or equal to SPT). As such, the SPT to reach zero is for a vertex on the tree that has a higher value (and note that node I is not calculated).

For some embodiments, when calculating the SPT, the DLSP system 200 may attempt to insert links that were not already part of the path k to find alternative paths (i.e., a second-best path). The path cost may not be lower or equal to the prior path (or the first path). If there is no alternative path, the path cost will be the same or equal. In sum, the tree is at I for each peer node and then will compute N−1 for peer node, where N is the degree of the vertex with the highest degree.

According to another embodiment, each of the nodes (e.g., nodes 201-205) also dynamically computes/determines a path (or paths) with qualifying load ratio(s). For one embodiment, a path with a qualifying load ratio is determined based on at least two link metrics, which are a path capacity and a path cost. A path capacity is based on a summation of a capacity of links on a path. A path cost is based on the product of a path latency (i.e., the summation of latency of links for a path) and a minimum IAT found for a link on the path, which is derived from a path bandwidth. Accordingly, the DLSP system 200 selects a best path based on the lowest path cost. Note that a path may be discarded when its path cost exceeds a predetermined value as compared to other paths, where the predetermined value is X and can be replaced by any desired number. For example, a path may be discarded if its path cost is X times higher than the other paths, where X is 100. Also note that this path is discarded due to its path cost having errors (e.g., a faulty link) or remarkably higher costs compared to the other paths (e.g., 100 times higher than the other paths).

According to another embodiment, each of the nodes (e.g., nodes 201-205) also dynamically computes a path of last resort. For one embodiment, a path last resort is determined based on several link metrics, including a path cost, a number of last resort paths to a destination, and a summation of path costs that are not considered paths of last resort.

For some embodiments, a path of last resort (i) overlaps with a path having a lower path cost, or (ii) is where the bandwidth of the path exceeds a bandwidth of a bottleneck link shared with links with lower path costs. To determine the path of last resort, the DLSP system assumes that at least two paths are overlapping or that there is a path with a higher path cost whose bandwidth is equal to the first link, as such the second link would be the path of last resort. In addition, a low ratio is also calculated to determine the path of last resort. A low ratio is a link metric used to determine how good a path is compared to other paths, where the low ratio can be set at a fixed variable V % (e.g., at 1%). Accordingly, the path of last resort is determined based on the following calculation:

Low ratio of paths not last resort=(100−$A$)×(path cost/$B$), where $A$=a number (#) of last resort paths to a destination, and B=a summation of
path costs not considered last resort paths.

Note that this will provide A (the number (#) of last resort paths to the destination), but a ceiling (or a threshold) can be placed on the number of paths that can be considered.

Continuing with FIG. 2, the multipath routing protocol (e.g., DLSP 215) of the DLSP system 200 populates a topology database (as shown in FIG. 12) with link state information that is dynamically obtained/monitored from peer nodes (e.g., nodes 201-205). This link state information is then partially advertised to the other peer; neighboring nodes, i.e., by only providing those changes to the topology database that exceed a given value. For example, after computation of the SPT, the DLSP 215 of node 204 may only advertise some of its links state information to its peer nodes 201-204, such as incremental changes to the SPT and messages of link failures. That is, the link state information advertised may include, hut is not limited to, when a link fails, a new link is discovered, a link metric exceeds a specified value, and changes to the SPT such as link latency and link bandwidth.

As described above, anode 205 with DLSP 215 sends one or more routing update messages to its peer nodes (e.g., nodes 201-204) that convey the state of links maintained on the topology database. For example, when node 205 periodically probes the links of its peer nodes, node 205 may establish/discover a new link with a new peer node (or a new node that was not initially in the network) and thus will send the link state information to the new peer node. Note that this link state information will only be shared with those nodes in the topology database that are part of the SPT.

According to some embodiments, each of the nodes 201-205 in the DLSP system 200 can be used to discover a new peer node (also referred to as a neighbor node). A node dynamically discovers new peer nodes (or neighbors) by sending out one or more neighbor discover packets (or probes) to establish adjacency with one or more new neighbor nodes. Accordingly, if the node does not receive any updates or "hello" packets from the neighbor node within a predetermined interval, the node determines that the neighbor node is unreachable. The predetermined interval is calculated based on an estimated link metrics to its neighbors.

The node 201 sends packets/probes periodically (e.g., every 10 seconds) to peer nodes 202-205 along links 221-225 and 271-278 to determine a link latency (or a latency of a link). The link latency is used to compute a running average between nodes (as opposed to a typical standard deviation that can be ineffectively high and/or inaccurate). Node 201 can determine the link latency to a peer node using at least one of a reply-back (e.g., a ping) transmission and a synchronization transmission. For one embodiment, the node determines a link latency to the peer node using a reply-back transmission by measuring a first timestamp indicating the time of transmission (the time when the initial packet is sent to the peer node) and a second timestamp indicating the time of response (the time when the reply-back packet is received by the node). For some embodiments, the node adds the transmission and the response times, and then divides the times by two to obtain the latency of the link to the peer node (i.e., the running average (or half the time) of the transmission and response times).

For another embodiment, a node determines a link latency to a peer node using a synchronization transmission (or a one-way latency transmission). To determine the link latency to the peer node using the one-way latency, the node (or the router) needs to have a DLSP mechanism (or controller) (e.g., DLSP 215) that allows synchronization. If the node has DLSP (as shown in FIG. 2), then the node can dynamically compute the one-way latency to the peer node by sending out a packet (also referred to as a single latency probe) with a first timestamp of the outgoing packet and placing a second timestamp of an incoming packet from the peer node. Note an advantage of the DLSP system is that a link metric, such as link latency, can be determined dynamically (at real-time) without a user command, a preset instruction, etc. (e.g., the DLSP can re-compute a link latency to a peer node in a network every 10 seconds).

Also note that in either transmissions (reply-back or synchronization), the node determines link latency using a running average. Then, the running average is used to determine a best set of changes in order to avoid making any unnecessary changes or reactions. For example, the node may update the topology database with a link state only when the running average exceeds a predetermined value to prevent unnecessary reactions.

In addition, the node 201 sends packets/probes periodically (e.g., every 10 seconds) to peer nodes 202-205 along links 221-225 and 271-278 to determine a link bandwidth (or a bandwidth of a link). The link bandwidth is used to calculate a maximum bandwidth of a link to a peer node, and an available bandwidth of the link to the peer node.

For some embodiments, the maximum bandwidth is based on the highest amount of bandwidth that can provided on a link without a competing load. For example, a node determines that a link has a maximum bandwidth of 10 Mbps between two connected routers.

For other embodiments, the available bandwidth is based on the maximum allowable bandwidth on the link that can be provided to an application assuming there is a cross load. For example, the node determines that the maximum bandwidth between the two connected routers is 10 Mbps, and that the path between the two nodes has two physical links but the information (or packets) can only be exchanged at 1 Mbps, since the Internet is being traversed by other traffic. Note that data traffic or available bandwidth is generally known or tracked when information is received by a peer node on a given link, and in turn that information may be periodically reported/advertised to the neighboring nodes.

According to some embodiments, a node dynamically computes a link bandwidth (taking into consideration both the maximum and available bandwidths) so that the DLSP can determine if a change exists deemed necessary to update the link state to the neighbor nodes.

For one embodiment, a node calculates a link bandwidth to a peer node using a maximum bandwidth estimation. To determine the maximum bandwidth, the node (e.g., node 201) periodically sends out a packet train on each link to each neighbor node (e.g., the packet train can be sent out every 10 seconds). As used herein, a "packet train" refers to a sequence of packets that are transmitted back-to-back in a link from a node to a peer node.

According to some embodiments, a number of packets in a packet train and a size of the packets in the packet train may vary according to the latest link state information received by the node. For example, to minimize a path cost on a data link, node 201 may send out (i) a shorter packet train on a low-band link, and (ii) a longer packet train on a higher-bandwidth link. As used herein, a "shorter packet train" refers to routing a small number of packets in a packet train, while a "longer packet train" refers to routing a larger/higher number of packets in a packet train.

According to other embodiments, node 201 may transmit a small frequency of packets on a low-bandwidth link and a larger frequency on a higher-bandwidth link. For one embodiment, after the node 201 has transmitted the packets, a peer node receives the packets from the node 201. This allows the node 201 to calculate the maximum bandwidth of the link by determining the IAT of the packets that were received by the peer node.

For some embodiments, a node calculates a link bandwidth to a peer node using an available bandwidth estimation. To determine the available bandwidth, the node (e.g., node 201) periodically sends out packets and probes on each link to each neighbor node (e.g., the packets/probes can be sent out every 10 seconds) to analyze data. For example, the node may use the packets and probes to dynamically determine link data information (or link state information), such as determining error links, monitoring a percentage of available bandwidth, and determining whether a packet has been routed.

For one embodiment, the node may monitor data traffic that has been received from a peer node on a given link. The node may then periodically report (or advertise) the link data information (including the monitored data traffic) to the peer node as an update message. In some embodiments, a forwarding engine (e.g., a forwarding engine of a router) in the DLSP network can use this information to forward data packets within the network to increase overall networking efficiency.

In addition, a node may also determine a variable measurement of a given link, which can be used to monitor a variable bandwidth of the given link. The variable measurement may be based on a maximum bandwidth and a latest estimate of available bandwidth, according to some embodiments. Note, however, that in a DLSP system the variable measurement may typically be set to 1.3 depending on the maximum bandwidth.

For another embodiment, a node dynamically computes an error rate on a given link in a network. As used herein, an "error rate link" refers to a number of packet errors in a link received by a node within a predetermined interval that have been altered due to bandwidth, latency, noise, interference, distortion, synchronization errors, etc. For example, a total number of packets sent to the peer node to determine the error rate of the link varies based on the latest estimate of maximum bandwidth. Note that for some embodiments, the DLSP system uses the error rate link to dynamically compute a link metric, which combines a link latency and a link bandwidth. Also note that the DLSP system 200 as shown in FIG. 2 can include one or more additional components which will be described in further detail below.

Figure 3:
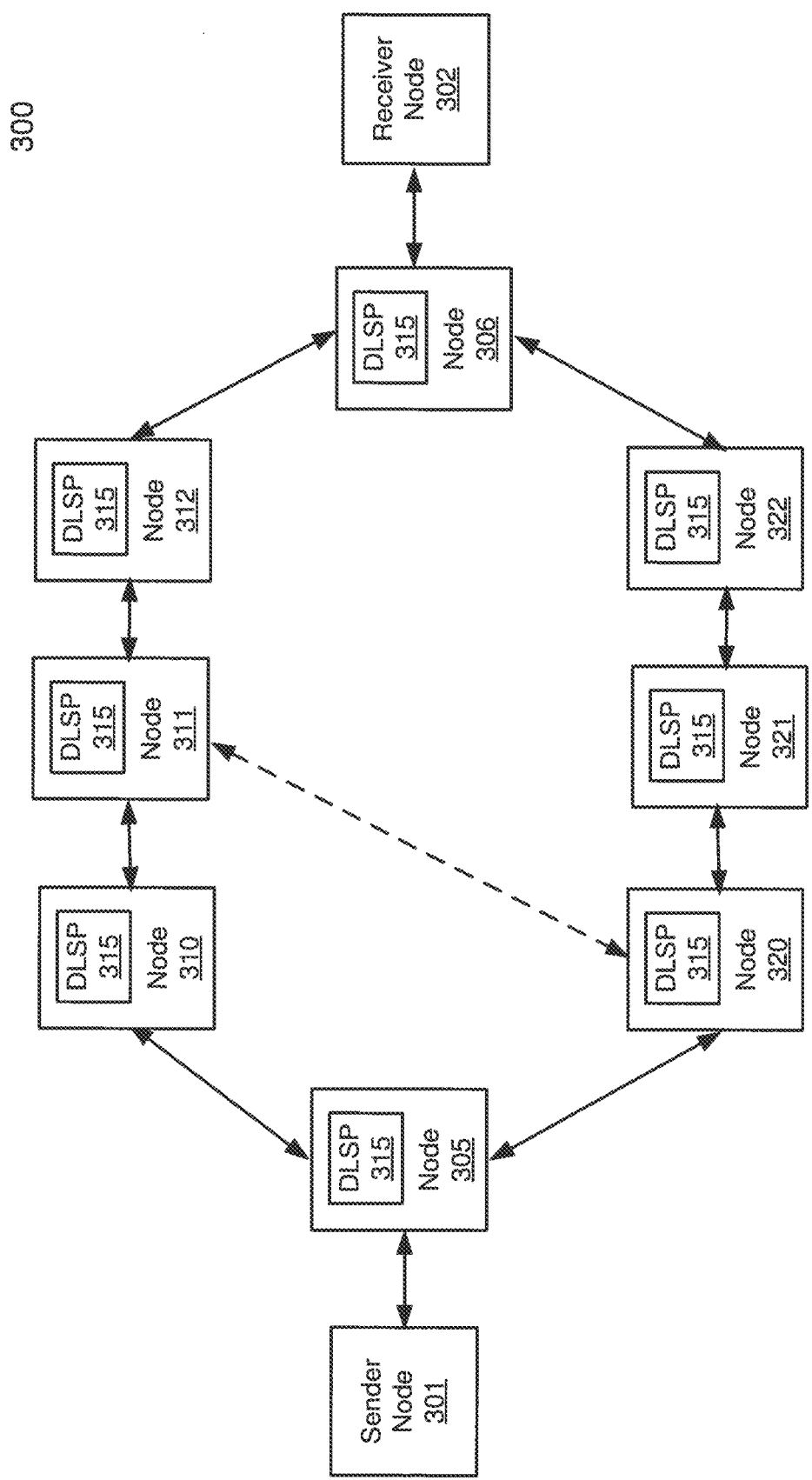
FIG. 3 is a block diagram of a DLSP system used to route packets in a network using a multicast transmission, according to one embodiment.
Figure 4:
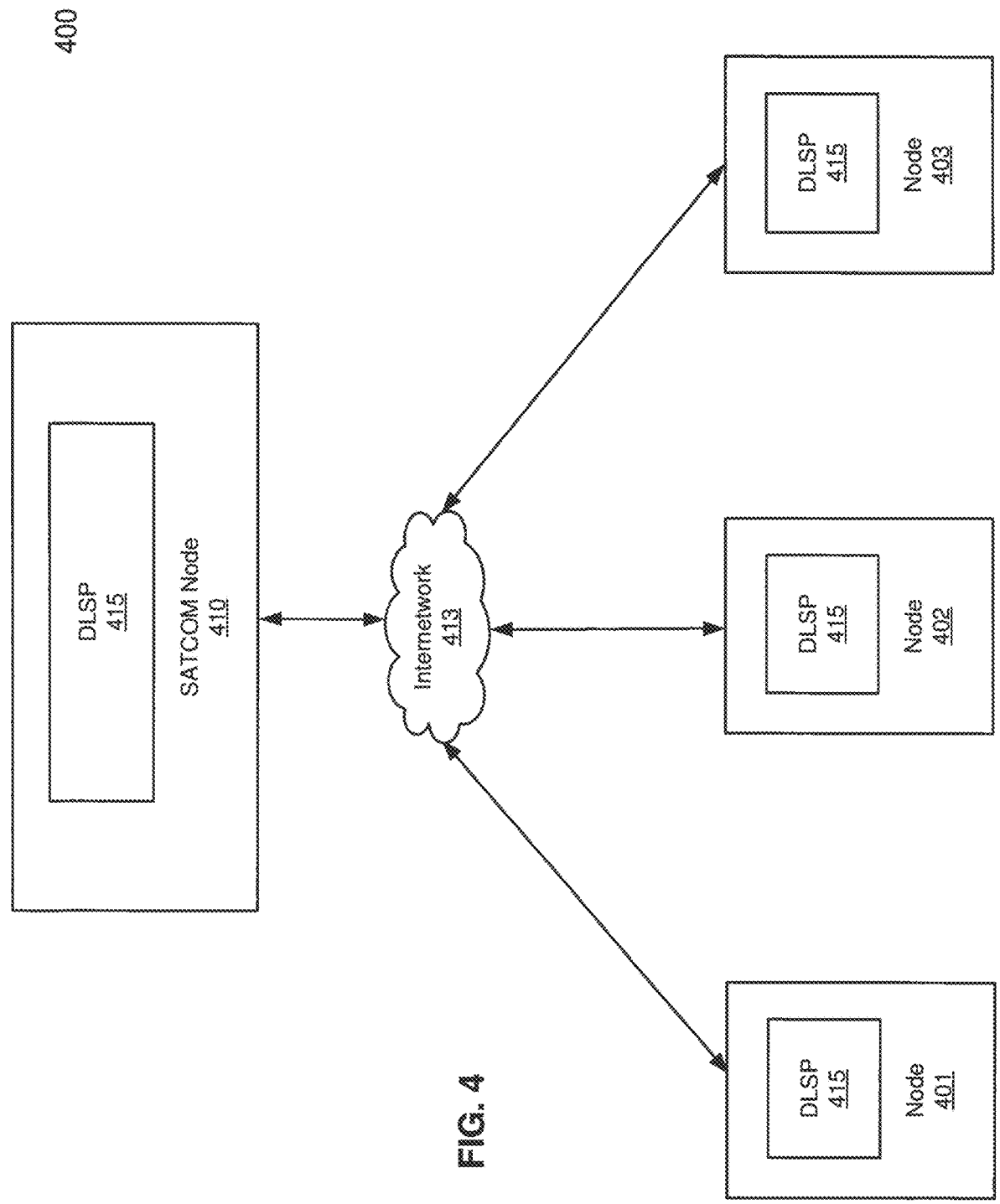
FIG. 4 is a block diagram of a DLSP system used to route packets in a network using a satellite communications (SATCOM) transmission, according to one embodiment.
Figure 5:
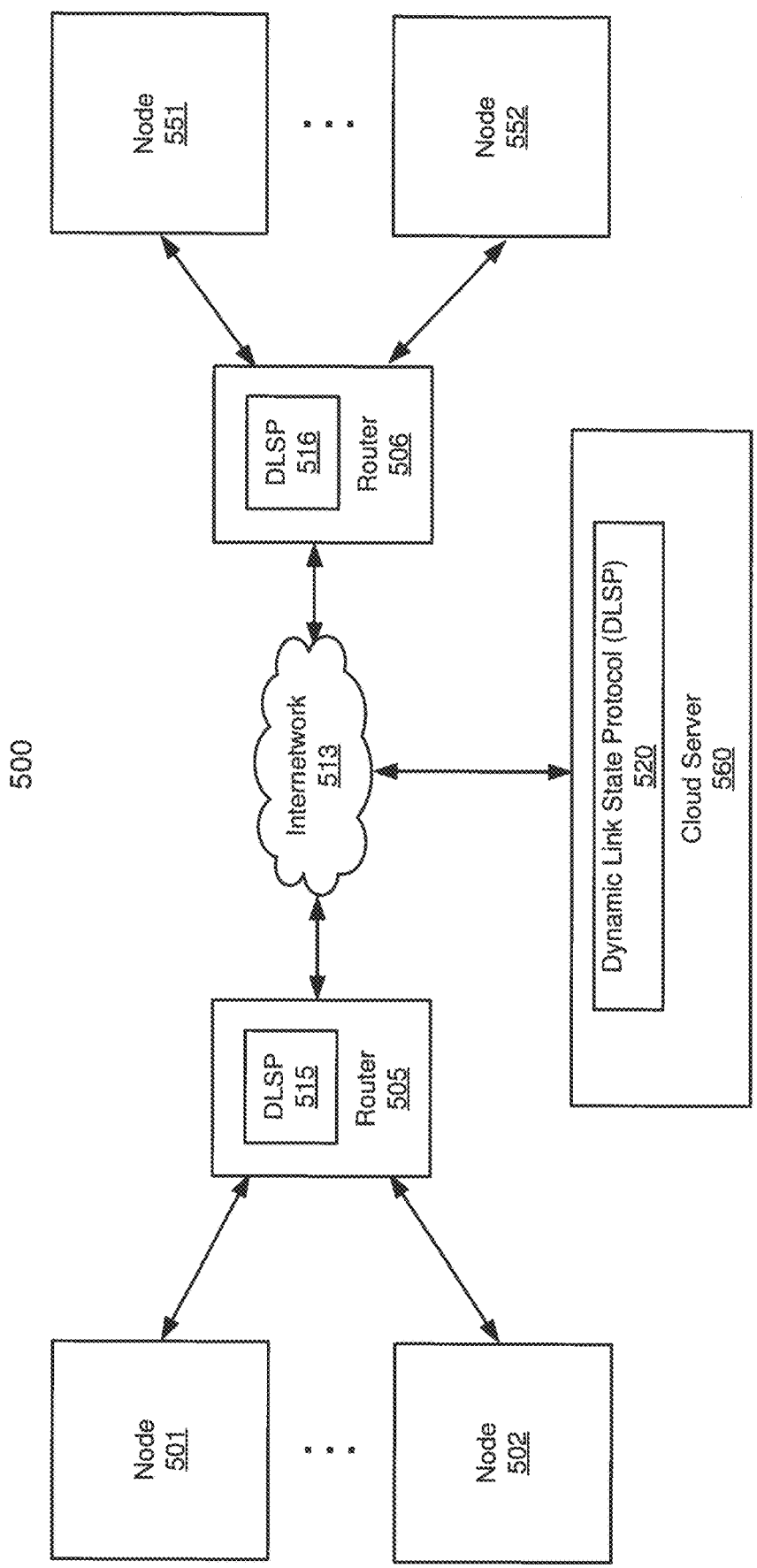
FIG. 5 is a block diagram of a DLSP system used to route packets in a network using a cloud computing system, according to one embodiment.

FIG. 3 illustrates a DLSP system 300 routing packets in an internetwork using a multicast transmission protocol, such as DLSP. The DLSP system 300 as shown in FIG. 3 is similar to the DLSP systems 100 and 200 of FIGS. 1 and 2. The DLSP system 300, however, implements a multicast transmission to route the data packets between nodes (i.e., routing packets along a network to multiple nodes at the same time). Note that a DLSP-enabled node implements a dynamic link state routing protocol that can be used with a unicast transmission (as shown in FIG. 1), a multipath transmission (as shown in FIG. 2), a multicast transmission (as shown in FIG. 3), a SATCOM transmission (as shown in FIG. 4), a cloud-based transmission (as shown in FIG. 5), and any other networking transmission.

For one embodiment, as described above, the DLSP system 300 may implement a multicast routing protocol having DLSP as the underlying protocol. For another embodiment, as shown in FIG. 3, the DLSP system 300 reduces communication overhead caused by packets that are routed to multiple receiver nodes (e.g., node 302) sharing the same SPT with a given multicast sender (e.g., node 301).

As illustrated in FIG. 3, DLSP 315 enables nodes 305-306, 314-312, and 320-322 to build a dynamic tree between sender node 301 and receiver node 302 in a multicast group. Nodes 305-306, 310-312, and 320-322 are routers that are running DLSP 315. The node 305 is connected to a multicast sender node 301 (or sender host) via a network (e.g., a local area network (LAN) network). The node 306 is connected to a multicast receiver node 302 (or receiver host) via a network (e.g., a LAN network). Note that as in any multicast transmission nodes 310-312 and 320-322 may additionally connect to one or more receiver nodes (not shown), according to some embodiments.

For one embodiment, the DLSP system 300 may be used to reduce the number of data packets (or control packets/messages) generated by DLSP when multiple receivers share the same shortest-path towards a given sender (e.g., sender 301). For this embodiment, the multiple receivers may include node 302, a first receiver node connected to node 322 (not shown), and a second receiver node connected to node 321 (not shown).

For example, the DLSP system 300 establishes that a shortest-path for routing packets from node 301 to node 302 is via nodes 320-322. As such, the DLSP system 300 does not have to transmit a JOIN message when both the first and second receiver nodes (not shown) issues a group membership request for this DLSP network. Accordingly, by reducing the transmittal of JOIN messages each time a new receiver node (e.g., a first and/or a second receiver node(s)) wants to join the network, the DLSP system 300 may benefit from a reduced packet/message overhead and thus allows for an improved multicast network with increased efficiency.

Likewise, the DLSP system 300 reduces a number of messages (or control messages) when receivers sharing the same shortest-path towards node 301 drop a group membership request for the network. For example, assuming the first and second receivers are connected to this network via 322-321 respectively (as described above), the DLSP system 300 establishes that a shortest-path for routing packets from node 301 to node 302 is via nodes 320-322.

Continuing with the example, the DLSP system 300 allows the first receiver node (not shown) to drop/leave the multicast group without having to relay an update message (e.g., a LEAVE message) from node 321 to node 320. Similarly, for example, if node 302 leaves the network, node 306 transmits a leave message to node 322 without having to further relay the message to the other nodes on the shortest-path (i.e., nodes 321-320, 305, and 301). As such, if an increased number of receivers want to join or leave the network, the DLSP system 300 is not impacted with an increased communication overhead of messages between the nodes.

According to some embodiments, a DLSP system (e.g., DLSP system 100, 200, 300, 400, and 500) has nodes that include forwarding engines (not shown). A forwarding engine of a node may implement configurable policies used to determine a best path in a network. The configurable policies include a dynamic link state routing protocol that decides What to do with packets arriving on an inbound interface of the node (i.e., decides how to route incoming packets from one node to another node). For one embodiment, the forwarding engine may receive notifications (or updates) such as, but is not limited to, a dynamic link state routing protocol (DLSP), a total number of available paths, a plurality of specifications regarding each of the networks that are reachable, and a router address (e.g., a destination address for the incoming packets). Note that each of the routers as described herein has a forwarding engine.

For some embodiments, the forwarding engine (also referred to as a multipath forwarding engine) can maintain one or more tables. The one or more tables include, but are not limited to, an interface table, a load distribution table, and an anchor table. An interface table maintains information on peer nodes, which is updated with outside forwarding agents. A load distribution table may include one or more entries, including a list of paths (or link patterns) to a given destination node, one or more attributes (e.g., a sequence of addresses), a load ratio of a path, an error rate, a link bandwidth, and a link latency. An anchor table maintains information of key entries, where each key entry can provide a network address for each of the routers on the topology database.

According to other embodiments, in the DLSP system (e.g., DLSP system 300), the forwarding engine of the node may implement configurable policies through one or more integrations (or rules), which are used to dynamically compute the best path in the network. The configurable policies (or rules) integrated in the DLSP forwarding engine are the following: 1) a priority-based policy, 2) a path latency policy (or a link latency policy), 3) a path bandwidth policy (or a link bandwidth policy), 4) a path bandwidth and latency policy (or a link bandwidth and latency policy), and 5) a path capacity policy (or a link capacity policy). In addition, the configurable policies maintain sessions (or track dialogs) between the nodes in each of the DLSP networks, which includes authenticating and encrypting the sessions (if they are authorized or belong to the DLSP networks). Note that the authentication and encrypting of packets is discussed in further detail below in FIG. 6.

The priority based policy configures a priority to a given port number. For example, when a session arrives with the given port number, the session is mapped to that port number (which may have a high priority or a low priority). The path latency policy configures a path latency requirement to a port number. For example, when a session arrives with a given port number, a map session provides a path latency to that session, where the path latency may be limited equal or lower than a predetermined value (X). The path bandwidth policy configures a session to have a minimum bandwidth requirement.

The path bandwidth and latency policy configures a link bandwidth and latency metric for each path (and/or session), which combines a link latency (or path latency) and a link bandwidth (or path bandwidth) as a combined link metric value. For example, the forwarding engine updates the load distribution table with the link bandwidth and latency metric after one or more rules are triggered (e.g., the metric exceeds a predetermine threshold/value, the metric changes by a given percentage, etc.). The path capacity policy configures/specifies a map session to a highest load ratio in order to have a maximum capacity for a path. In addition, session policies may be configured and mapped with a deep packet inspection (DPI).

As described herein, a session having a dynamic link state routing protocol is monitored by a DLSP unit (or DLSP module), such as DLSP 315. The DLSP unit 315 (also referred to as the DLSP) dynamically determines a best path by periodically probing links of peer nodes to monitor/obtain a link bandwidth and a link latency of each link. The DLSP 315 periodically recalculates the link bandwidth and the link latency of each link used by the session, and reconfigures one or more packets and transmits other packets associated with the session based on at least one of the obtained link bandwidth, the obtained link latency, and the DLSP policy, as described herein. For at least some embodiments, the session (or the session flow) is a congestion controlled session (also referred to as transport protocols), e.g., a Transmission Control Protocol ("TCP"), a Stream Control Transmission Protocol ("KIP") session, or other controlled sessions. Typically, a Transmission. Control Protocol ("TCP") session has a defined start and end by the protocol definition. Meanwhile, a User Datagram Protocol ("UDP") session is generally defined as a first packet arrives, and the session end is defined as a time period that elapses with no data packet exchange on the session. Typically, a UDP session is considered a non-congestion controlled session.

For at least some embodiments, as used herein, a "session" refers to a dialogue of information between two hosts and/or nodes. For example, each flow of packets (or each stream of packets) is tracked as packets that traverse a router in a "session," For one embodiment, when the initial packets are received at the router (e.g., node 305), a session containing a virtual circuit (VC) path is created for the flow to track what is going through the router, e.g., how many bytes it received by another network device, how many bytes is going out of the router, and the like.

For other embodiments, the "session" includes the dialogue of information between two nodes used to determine if the session is authorized in the network. This is established with the DLSP by authenticating the received packets and then encrypting the packets before transmitting them to another node (as described in FIG. 6). Note that if the DLSP-enabled router determines that the session is not authorized, the router may end the session between the hosts without transmitting the packets.

According to some embodiments, each of the packets belonging to a session go over the same session, but the session between the same pair of hosts may be mapped to different paths. For example, the session of the DLSP system (e.g., DLSP system 300) maps paths according to several policies including: 1) using the full bandwidth prior to sending, 2) selecting the least congested path, 3) sending more data then supposed to, and 4) determining whether a congestion threshold has been reached and if so mapping session for a second-best path. For example, a node may remap to another best session when the best path triggers the congestion threshold.

Note that in order for each of the policies to work efficiently there has to be an effective information exchange between each host. Accordingly, when a packet arrives and is received by the host, the router determines a destination for the packet by performing a table lookup to establish the path of the session.

A DLSP system, such as DLSP system 300, also establishes one or more virtual circuit (VC) paths using one or more links of the network (e.g., using the link connection between node 320 and 311 shown as a dotted line). A VC may include a VC table, a map and session policy, and a message exchange policy. As used herein, a "virtual circuit" refers to a path that routes packets over a network in such a way that it performs as though there is a dedicated physical layer link between a sender node (e.g., node 301) and a receiver node (e.g., node 302).

For one embodiment, the DLSP system 300 manages one or more VCs (e.g., the VC between node 320 and 311) that help establish the best path for routing the packets from sender node 301 to receiver node 302. For example, if no packets have been seen or received, a router sends messages specifying an IP address on a map and a sequence of routers that should process the map. The router may initially address the path, and then the DLSP of the router receives the addressed path and accordingly selects a peer node (or peer nodes) to transmit the packets. For example, the DLSP system may include a source Node (Head AR) and a receiving node (Tail AR), such as sender node 301 and receiver node 302 respectively. Meanwhile, the DLSP system also include one or more intermediary nodes on the path that take note of the VC and implement their own table lookup to determine where the packet came from.

For one embodiment, a VC table is used to manage the information that is obtained from establishing one or more VCs in the network. With the path/link information obtained from the incoming information, the router uses the obtained information aligned with the VC table to then transmit data to other nodes. Note that each router is able to use information following the sequence of the routers that were originally selected (or put in place) by the source router.

In addition, a map and session policy is also used to manage the information that is obtained from the one or more VCs in the network. The map and session policy may include a session table that allow one or more sessions to be mapped to another VC during their lifetime. As such, mapping sessions may be kept to a specific path so long as a threshold is not exceeded. Note that when mapped sessions on a given path exceed their threshold, this information (or update) needs to be reported to other nodes over the links on the mapped path.

For another embodiment, a message exchange policy is used to manage the information that is obtained from the one or more VCs in the network. The message exchange policy includes reliably sending messages to neighboring nodes based on link state information, routing protocols, and link state updates (e.g., changes to links). The message exchange policy also includes waiting for acknowledgements (e.g., waiting for forwarding messages between head and tail nodes) from the neighboring nodes once the sent messages are received by the neighboring nodes.

Note that the DLSP system 300 as shown in FIG. 3 can include one or more additional components which will be described in further detail below.

FIG. 4 illustrates a DLSP system 400 routing packet(s) in an internetwork 413 (e.g., Internet) using a SATCOM routing protocol (or SATCOM routing transmission), such as DLSP 415. The DLSP system 400 as shown in FIG. 4 is similar to the DLSP systems 100, 200, and 300 of FIGS. 1-3. In addition, FIG. 9 also illustrates a process flow, as described herein, for routing packets in a network using the SATCOM routing protocol, such as DLSP 415.

For one embodiment, the DLSP system 400 includes one or more network devices, e.g., nodes 401-403 that can act as a source device (or a multipath sender host) to transmit packets, a destination device (or a multipath receiver host) to receive the packets, and/or any other routing device (e.g., a switch, a controller, a router, a module, a kernel, etc.). For some embodiments, each of the network devices can forward the packets along a link, and then change (or re-route) the packets to another link in the path based on the DLSP 415, as described herein.

Further, as shown in FIG. 4, the DLSP system 400 shows a network topology that includes a SATCOM node 410 having DLSP 415, and one or more nodes 401-403 having DLSP 415. In addition, each node 401-403 is connected along a path (or a tunnel) to the internetwork. 413 that connects with the SATCOM node 410. As used here, a "SATCOM" transmission refers to a routing protocol used to establish packet transfers between nodes using a communication satellite (e.g., SATCOM node 410).

For some embodiments, the DLSP system 400 may use a given tunnel (as shown with the double-sided arrows) to estimate a bandwidth running over a type of satellite link that essentially adjusts a data transfer rate based on the demand. For example, if you use a typical probing method rather than the SATCOM probing method (as shown in FIG. 4), the network system would underestimate the link due to the satellite connection, i.e., when a packer train is received, the packet train would be sent out but not at the expected/desired rate.

Typically, the packet gap time between nodes would be considerably long since the packets are not sent back-to-back (e.g., bandwidth-on-demand). In response to this extensive packet gap time, the DLSP system 400 uses a dynamic link routing protocol (e.g., DLSP 415) to send as many probes as possible during a short time interval. In other words, for example, the DLSP system 400 blasts the link between nodes 401 and SATCOM node 410 with multiple packets (or a long packet train) in the short time interval, which allows the packets to be transmitted back-to-back rather than spread out. Note that this is established prior to bringing the link up (or before opening the connection/link to the peer node).

For one embodiment, while the DLSP system 400 fills the link between the node 401 and the SATCOM node 410 to determine the link bandwidth, the DLSP system 400 is dynamically authenticating the link between nodes 401 and 410 and encrypting the packets that would be transmitted over the link. Then after the authentication process (if the nodes are authorized on the link), the DLSP system 400 uses the determined the link bandwidth and thus opens the distant connection/link between node 401 and SATCOM 410. According to some embodiments, once the link is up between the nodes, node 401 may send a packet train to recalculate the link bandwidth to SATCOM node 410, and then SATCOM node 410 will do the same recalculation in case the estimated links between the nodes have changed. Note that this initial recalculation of bandwidth and latency is done since both uplink and downlink times can be different.

Initially, the DLSP system 400 sends out a long packet train, according to one embodiment. For some embodiments, the DLSP system 400 uses the initial long packet train to establish a best path based on an inter-packet gap time between the nodes and a total number of packets received by each node. Meanwhile, as the DLSP system 400 sends out the long packet train, the link between nodes 401 and 410 is not being used for routing while the system is bringing up the link. At first, the link is set to have a low bandwidth (e.g., 256 Kbps) and a high latency while the DLSP system 400 brings up the link. Note that during this time there is still a poor link between nodes 401 and 410. However, a second or so after bringing up the link between nodes 401 and 410, the DLSP system 400 recalculates the bandwidths (as described above) between nodes 401 and 410 and then dynamically readjusts the link to maximize the link bandwidth and latency. Accordingly, the DLSP system 400 continues to periodically recalculate (e.g., every 10 seconds) the link bandwidth and the link latency to fine-tune the link between nodes 401 and 410 for subsequent packet transfers, which allows the overhead on the network to be minimal.

Note that the DLSP system 400 as shown in FIG. 4 can include one or more additional components which will be described in further detail below, FIG. 5 illustrates a DLSP system 500 routing packet(s) in an internetwork 513 (e.g., Internet) using a cloud computing protocol, such as DLSP 515, 516, and 520. The DLSP system 500 as shown in FIG. 5 is similar to the DLSP systems 100, 200, 300, and 400 of FIGS. 1-4.

For one embodiment, the DLSP system 500 includes one or more network devices, e.g., nodes 501-502, 505-506, and 551-552 that can act as a source device (or a sender host) to transmit packets, a destination device (or a receiver host) to receive the packets, and/or any other routing device (e.g., a switch, a controller, a router, a module, a kernel, etc.). For some embodiments, each of the network devices can forward the packets along a link, and then dynamically change (or re-route) the packets to another link in the path based on the DLSP 515, 516, and 520, as described herein.

Further, as shown in FIG. 5, the DLSP system 500 shows a network topology that includes a cloud server 560 having DLSP 520, one or more routers 505-506 having DLSP 515-516, and the routers 505-506 connected to nodes 501-502 and 551-552, respectively. In addition, each of the nodes 501-502, 505-506, and 551-552 is connected along a path (or a tunnel) to the internetwork 513 that connects with the cloud server 560 (also referred to as a cloud node). As used here, a "cloud" computing protocol refers to a routing protocol used to establish packet transfers between nodes using a cloud server that has a DLSP (e.g., cloud server 560 having DLSP 520). Note that the cloud computing protocol may be used when a node in the network is using a router that is not implemented with DLSP. Also note the cloud computing protocol uses the same DLSP as described herein, hut the cloud computing protocol may include one or more additional components For one embodiment, nodes 501-502 and 551-552 may be any type of network device (or client), such as a host, a server, a personal computer (e.g., desktops, laptops, and tablets), a "thin" client, a personal digital assistant (PDA), a Web enabled appliance, or a mobile phone (e.g., Smartphone), etc. In addition, according to some embodiments, the internetwork 513 may be any type of networks such as a local area network (LAN), a wide area network (WAN) including the Internet, a fiber network, a storage network, or a combination thereof, wired or wireless. Nodes 501-502 and 551-552 may be in physical proximity or may be physically remote from one another. Cloud system 560 may be located in proximity to one, both, or neither of clients 501-502 and 551-552.

Cloud server 560 may be a DLSP networking storage system that includes or represents any type of servers or a cluster of one or more servers (e.g., cloud servers). For example, cloud server 560 may be a networking server used for various different purposes, such as to provide nodes with access to one or more links in the network using the dynamic link state routing protocol, as described herein. Cloud server 560 may provide one or more DLSP networking services to nodes via a variety of access interfaces and/or protocols, such as DLSP's authentication and encryption protocol.

Cloud storage server 160 may further provide one or more networking services via a DLSP software-defined networking (SDN) protocol. Cloud server 560 may have a distributed architecture, or all of its components may be integrated into a single unit.

For one embodiment, the cloud server 560 has a DLSP 520 (also referred to as a DLSP module, a DLSP engine, or DLSP unit, which may be implemented in software, hardware, or a combination thereof) that is configured to manage the routing protocols of the cloud server 560, which may include, for example, networking and processing resources (e.g., processor, memory, and/or network resources). For some embodiments, the DLSP 520 may be accessed by any of the nodes 501-502, 505-506, and 551-552 that are authorized and connected to the cloud server 560 remotely via a management or configuration interface (not shown). According to some embodiments, the DLSP 520 of the cloud server 560 provides virtual (or cloud) networking resources that can be provisioned, modified, allocated, and/or defined by an authorized node or a service provider based on a set of software-defined policies.

For one embodiment, the DLSP system 500 routes packets on the network from one node (e.g., node 501) to another peer node (e.g., node 552) using the DLSP 520 of the cloud server 560. The DLSP system 500 can then dynamically compute a best path by periodically probing one or more links of the peer nodes in the network to determine the best path based on the calculated link bandwidth and link latency of the peer nodes. For some embodiments, the DLSP system 500 re-computes the link bandwidth and the link latency of the peer nodes every 10 seconds to establish the best path (or to change to a better best path), and monitors the link state information of each peer node in the network every 60 seconds in case an update message is needed. Note that the DLSP system 500 as shown in FIG. 5 can include one or more additional components as described in further detail below.

Figure 6:
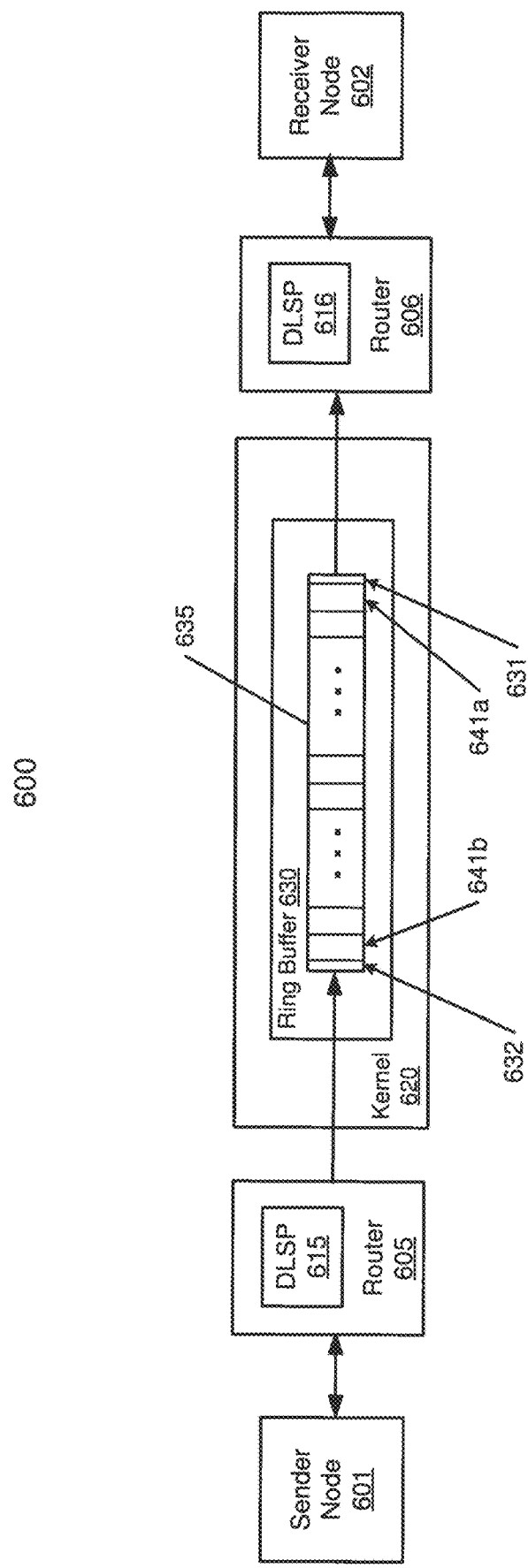
FIG. 6 is a block diagram of a DLSP system that includes a sender node, a receiver node, one or more routers with DLSP, and a kernel that further includes a ring buffer used to transmit one or more packet trains, according to one embodiment.

FIG. 6 illustrates a DLSP system 600 routing packets along a network (e.g., Internet) using a dynamic link state routing protocol, such as DLSP 615-616. The DLSP system 600 as shown in FIG. 6 is similar to the DLSP systems 100, 200, 300, 400, and 500 of FIGS. 1-5.

The DLSP system 600 includes a sender node 601, a receiver node 602, one or more routers 605-606 with DLSP 615-616, and a kernel 620. For one embodiment, the kernel 520 further includes a ring buffer 630 that is used to receive packets 641*a-b* of a packet train 635 from sender node 601, queue the packets 641*a-b* of the packet train 635 with one or more flags 631-632, and then transmit the packets 641*a-b* of the packet train 635 towards receiver node 602. Note that the DLSP system 600 may be omitting one or more components to simplify the process.

According to some embodiments, prior to transmitting packets from sender node 601 to receiver node 602, a session between the nodes 601-602 has to be authorized. Each of nodes 605-606 may be used to authorize the session between nodes 601-602 via the DLSP (e.g., DLSP 615-616).

To determine if the session is authorized, the router 605 receives a packet 641 (or a packet train 635) from the sender node 601, authenticates the received packet 641 (or packet train 635), and then encrypts the packet 641 (or packet train 635) before transmitting them to another node, such as router 606. Note that if a DLSP-enabled router determines that a session is not authorized, the router may end the session between the nodes without transmitting the packets.

For some embodiments, the router decides to accept or decline the session based on the information received in the packet train. In addition, the DLSP system 600 may prevent the router from accessing accession between the nodes if the packet train does not have a shared secret key. The information transmitted in the packet train may include on one or more parameters including, but not limited to, a source map, an information map, a source port number, a destination port number, a transport protocol, a source destination address, a destination address, and a shared secret key.

For one embodiment, the DLSP system may allocate a percentage of bandwidth (e.g., 5%) for an application to handle the authentication and encryption policy. The authentication and encryption policy may use a lookup table that includes indexes that crosscheck shared secret keys with randomized timestamps. For example, a router obtains a session with a timestamp of when the packets were received, and then the router verifies with the lookup table that the packets include the authorized shared secret key for that given timestamp. As such, the authentication and encryption policy is periodically changing the shared secret key every couple of seconds so that the policies create randomized shared keys for a given internal (or timestamp).

As described above, the DLSP system 600 relies on a shared secret key that is transmitted in the packet train (i.e., the shared secret key is stored on the code itself). The shared key can also be changed by configuration policies. Likewise, the DLSP system 600 uses the shared key as an encryption key (e.g., a 256-bit key) to encrypt and decrypt certain information transmitted over the packet train. Accordingly, to share information over a session, all of the nodes in the authorized network need to have the same shared key, which is configurable.

In addition, embedded in the information of the session is a mechanism (e.g., a DLSP unit) that frequently changes the shared key from one key to another. For example, in addition to frequently changing the shared keys, the DLSP is used keep the nodes in sync, where each of the nodes is synchronized to identify that the shared keys are switched every couple of seconds (i.e., every couple of seconds the node identifies the authorized shared key from a plurality of shared keys based on a timestamp (or a specified interval).

According to some embodiments, after the shared key is changed, the new shared key is not transmitted on the packet train. Instead, the DLSP system sends out one or more indexes, where each index represents a message to the node that the present shared key may be changing within a couple of seconds (i.e., the index informs the node of the changes, not that the key itself needs to be changed). The index is also used to encrypt the packet train. Note, however, that a small portion of the header (or the index) in the packet train is not encrypted so that it can convey this information. Also note that the shared secret keys are not static.

For some embodiments, the index and the content of the entry pointed by that index also changes. For example, if the same index is transmitted at different time intervals, the DLSP system may be able to point to different shared keys at randomized time intervals. That is, if the DLSP system sends out an index 5 at a first-time interval T1 and then sends out an index 5 at a second-time interval T2 (a minute later after the first-time interval T1), the DLSP system is going to be pointing to different and randomly created shared keys (even if they have the same index) based on the different time intervals (the first-time interval T1 is not equal to the second time interval T2=(T1+60 seconds)). Note that an advantage of the DLSP system using a shared secret key is that the DLSP system could have multiple logical networks running at the same time with multiple nodes co-located.

For example, if the network is using different shared keys, multiple nodes can be co-located in the same terminal (or the same net interface) and/or in different logical networks without relying on any other configuration. Based on the synchronization of each authorized node sharing different keys, multiple nodes can be co-located in the same terminal as each node is informed of which peer nodes it can talk to and which peer nodes it cannot talk to. Accordingly, each logical network can use a different shared key and be run on the same layer to the main LAN without interfering other logical networks.

Referring back to FIG. 6, the kernel 620 receives a flow of packets 641a-b (where packet 641b can be any Nth number of packets following packet 641a as the initial incoming packet) to be routed from sender node 601 to receiver node 602. As used herein, a "flow" refers to a stream of data packets (e.g., packets 641a-b) between two hosts (e.g., nodes 601-602). For at least some embodiments, the flow is defined uniquely by its tuples (e.g., source IP address, source port, destination IP address, destination port, link latency, link bandwidth, error rate, load ratio, etc.) from the packet header or any combination thereof. For some embodiments, the packet information that defines the flow may be expanded to include other information from the packet header. For one embodiment, the flow may be uniquely defined at a given time. For example, two concurrent flows on the same network may be identified as different flows based on different data obtained from the packet header.

For at least some embodiments, the flows are defined by a packet header information that includes link states for the nodes in the network, such as a path identification (ID), an IP source address, an IP destination address, a link bandwidth, a link latency, and error rate, a load distribution/ratio (%), a path cost, a path hop(s), one or more packet header data, or any combination thereof. For at least some embodiments, every time packets are routed in the DLSP network, the DLSP policy includes a link bandwidth and a link latency that are allocated (e.g., as a single link metric value) to the flow of packets from one node to another.

For some embodiments, the DLSP system 600 determines a link bandwidth based on a packet train (e.g., packet train 635) and a link latency based on a single packet (e.g., packet 641a). As illustrated in FIG. 6, the packet train 635 is a sequence of packets 641a-b that are being transmitted back-to-back. Note, however, that a length of the packet train and a number of packets in the packet train may vary based on multiple factors, as described herein. For example, if the DLSP determines that a given link is a low-throughput link, the DLSP may implement the kernel to queue the packets and send them in shorter packet trains as shorter packets.

In addition, the forwarding agent (e.g., the DLSP-enabled router 605) implements one or more flags 631-632 to assure that the packets are sent back-to-back as the packets 641a-b are transmitted to the kernel 620 along the packet train 635. For some embodiments, the one or more flags 631-632 are implemented at the kernel 620 to establish the following policies: (i) the first flag 631 identifies that a given packet (or packets) belong to a given packet train, and (ii) the second flag 632 identifies that the given packet belongs to the given packet train and that the given packet is also the last packet of the given packet train.

For example, as illustrated in FIG. 6, the kernel 620 detects flag 631 to identify that the packets 641a-b belong to the packet train 635, where the ring buffer 630 queues the packets 641a-b in a back-to-back sequence until the kernel 620 detects flag 632. When the kernel detects flag 632, the kernel 620 identifies that (i) packets 641a-b belong, to the packet train 635, (ii) the packet 641b is also the last packet of the packet train 635, (iii) the ring buffer 630 is done queuing packets for the packet train 635, and (iv) the packets 641a-b of the packet train 635 are ready to be transmitted/forwarded to the peer node (e.g., router 606). Note that after a first flag is set, a kernel saves the ensuing packets and every other packet that belongs to a given packet train in a ring buffer (even if the other packets are not sent back-to-back).

As a result, when the kernel 620 receives the flag 632, the kernel 620 starts the transmission of the packets 641a-b in the ring buffer 630 and sends the packets 641a-b that are queued in the ring buffer 630 as a back-to-back transmission—without any of the packets 641a-b being omitted from the packet train 635. For one embodiment, the kernel 620 forwards the packets 641a-b belonging to the packet train 635 to the router 606, where the DLSP 616 receives all the queued packets 641a-b back-to-back.

For another embodiment, the DLSP system may decide not to probe the paths often when the DLSP system is estimating the link latency. If this is the case, the DLSP sends a single latency probe to measure link latency. The kernel then identifies the single latency probe enclosed in the packet and directs the ring buffer to place the single latency probe ahead of the queue regardless of what is in the queue. The single latency probe thus skips the queued packets in the ring buffer and is placed in the front of the backlog of data packets. This embodiment allows the single latency probe, which measures the latency of the link to the peer node, not to experience the local queuing time. As such, the single latency probe only measures the latency need of the link and maintains a low oscillation on the latency measurement without being impacted by the local queuing time. This allows the DLSP system to have accurate measurements on each of the latency links to each of the peer nodes.\

Note that the DLSP system 600 as shown in FIG. 6 can include fewer components (or additional components) to simplify the embodiments.

Figure 7:
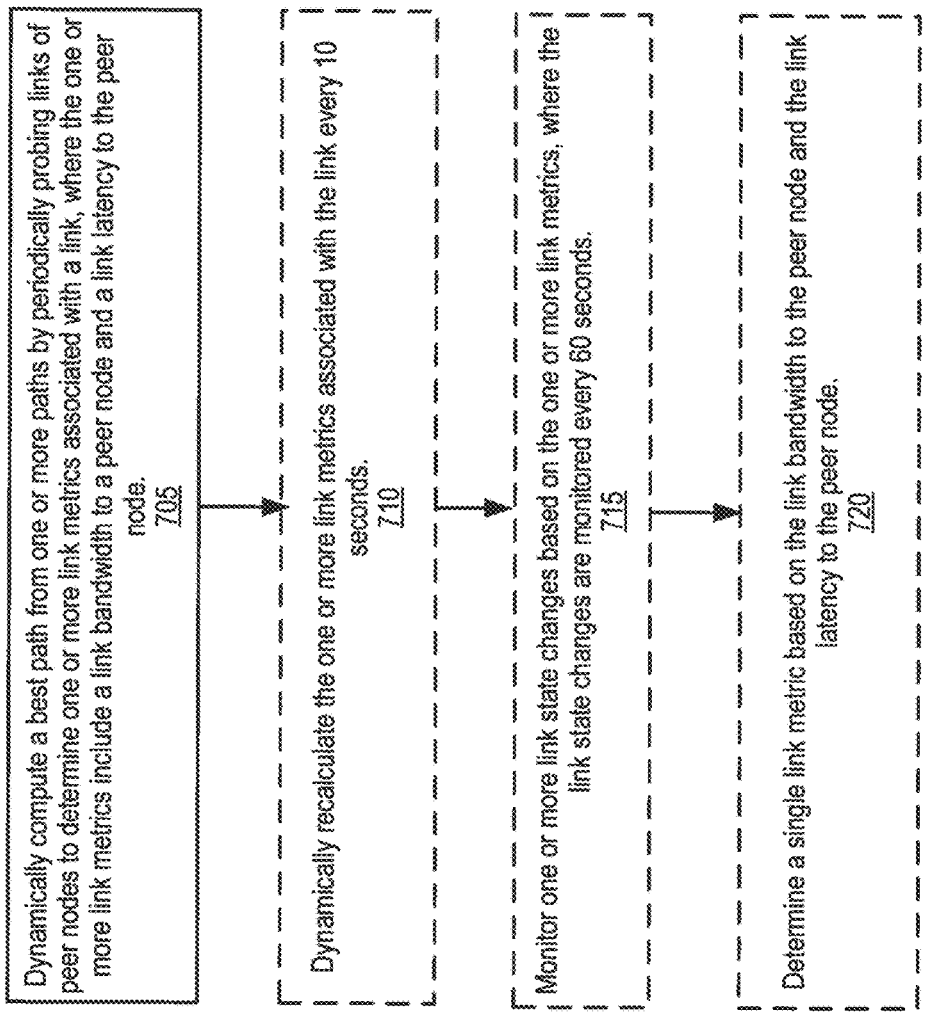
FIG. 7 is a process flow illustrating a method for routing packets in a network using a DLSP system (e.g., a unicast transmission), according to one embodiment.

FIG. 7 is a process flow 700 illustrating a method for routing packets in a network based on a dynamic link state routing protocol (e.g., the DLSP 115 of FIG. 1). For example, the process flow 700 may use a unicast transmission (as shown in FIG. 1) to route packets between nodes. For one embodiment, the process flow 700 may be implemented in a DLSP system as shown in FIGS. 1-6.

At block 705, the process flow dynamically computes a best path from one or more paths by periodically probing links of peer nodes to determine one or more link metrics associated with a link, where the one or more link metrics include a link bandwidth to a peer node and a link latency to the peer node.

At block 710, the process flow may dynamically recalculate the one or more link metrics associated with the link every 10 seconds. At block 715, the process flow may monitor one or more link state changes based on the one or more link metrics, where the link state changes are monitored every 60 seconds. At block 720, the process flow may determine a single link metric based on the link bandwidth to the peer node and the link latency to the peer node.

For example, process flow 700 may dynamically calculate the best path between nodes using the DLSP (as shown in FIGS. 1-6). Note that blocks 710, 715, and 720 may be optional steps and/or modified steps (e.g., based on a default and/or a desired DLSP routing protocol).

Note that the link bandwidth may refer to the number of packets that can be transferred from the first node to the second node, meanwhile the link latency may refer to the time that a packet takes to travel from the first node to the second node. Also note that the process flow 700 as shown in FIG. 7 can include fewer or additional blocks based on the dynamic link state routing protocol, as described herein.

Figure 8:
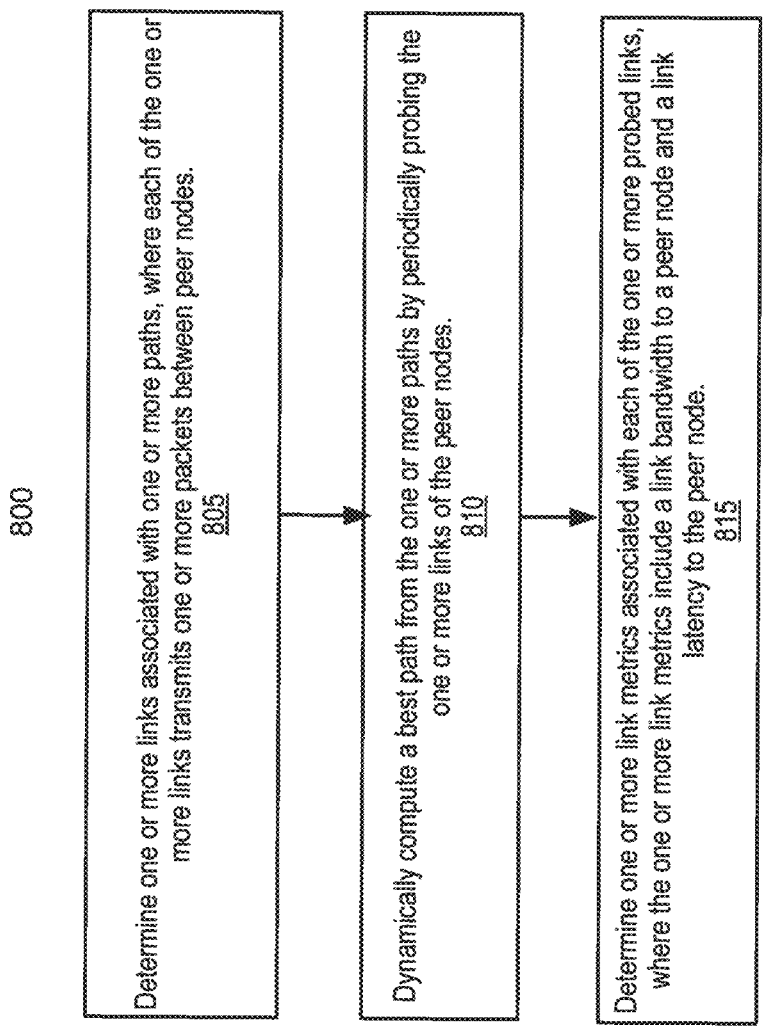
FIG. 8 is a process flow illustrating a method for routing packets in a network using a DLSP system (e.g., a multipath transmission), according to one embodiment.

FIG. 8 is a process flow 800 illustrating a method for routing packets in a network based on a dynamic link state routing protocol (e.g., the DLSP 215 of FIG. 2). For example, the process flow 800 may use a multipath transmission (as shown in FIG. 2) to route packets between nodes. For one embodiment, the process flow 800 may be implemented in a DLSP system as shown in FIGS. 1-6.

At block 805, the process flow determines one or more links associated with one or more paths, where each of the one or more links transmits one or more packets between peer nodes.

At block 810, the process flow dynamically computes a best path from the one or more paths by periodically probing the one or more links of the peer nodes.

At block 815, the process flow determines one or more link metrics associated with each of the one or more probed links, where the one or more link metrics include a link bandwidth to a peer node and a link latency to the peer node.

Figure 9:
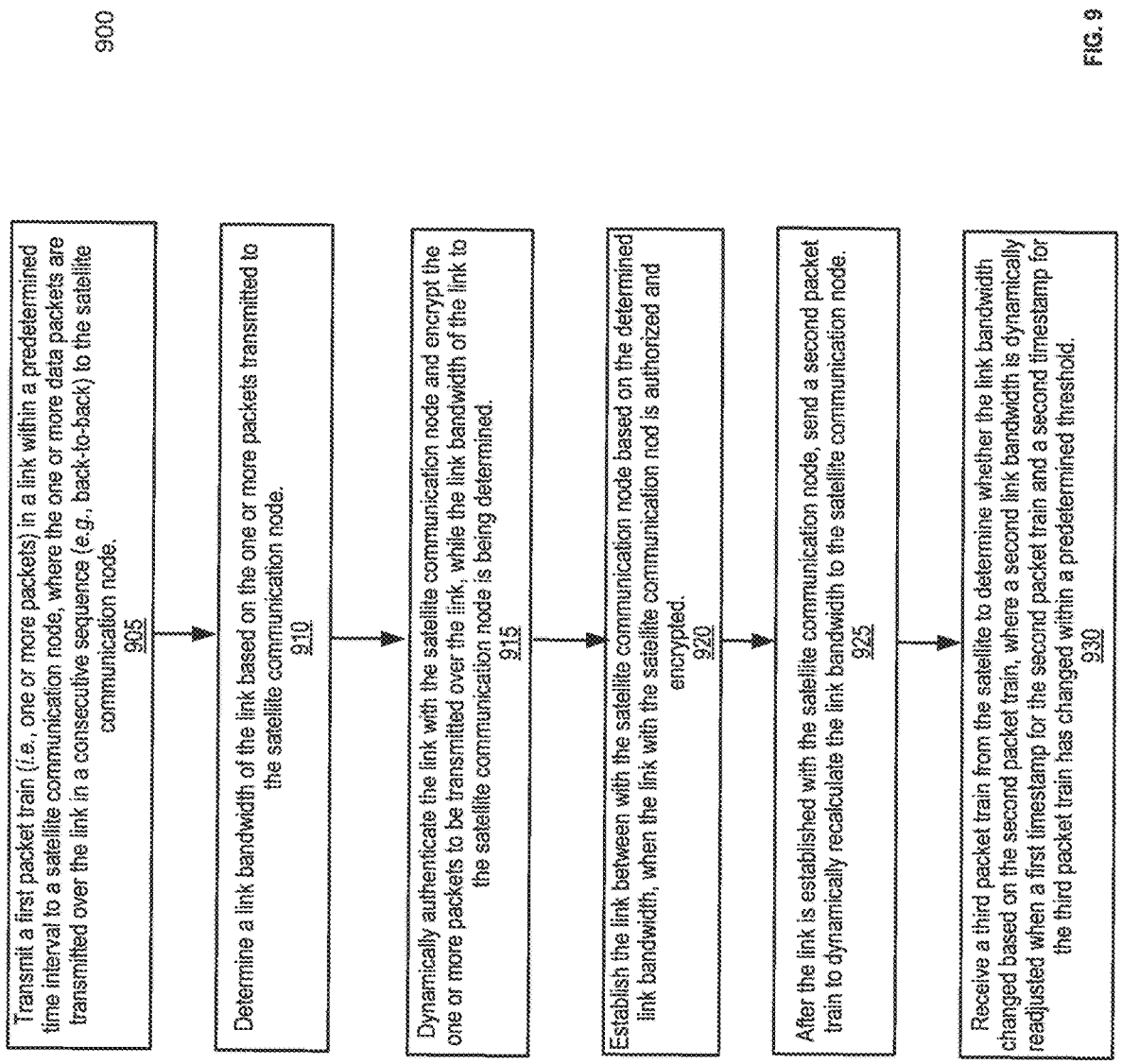
FIG. 9 is a process flow illustrating a method for routing packets in a network using a DLSP system (e.g., a SATCOM transmission), according to one embodiment.

For example, process flow 800 may dynamically calculate the best path between nodes using the DLSP (as shown in FIGS. 1-6). Also note that the process flow 800 as shown in FIG. 8 can include fewer or additional blocks based on the dynamic link state routing protocol, as described herein, FIG. 9 is a process flow 900 illustrating a method for routing packets in a network based on a dynamic link state routing protocol (e.g., the DLSP 415 of FIG. 4). For example, the process flow 900 may use a SATCOM transmission (as shown in FIG. 4) to route packets between nodes. For one embodiment, the process flow 900 may be implemented in a DLSP system as shown in FIGS. 1-6.

At block 905, the process flow transmits a first packet train (i.e., one or more packets) in a link within a predetermined time interval to a satellite communication node, where the one or more data packets are transmitted over the link in a consecutive sequence (e.g., back-to-back) to the satellite communication node.

At block 910, the process flow determines a link bandwidth of the link based on the one or more packets transmitted to the satellite communication node.

At block 915, the process flow dynamically authenticates the link with the satellite communication node and encrypt the one or more packets to be transmitted over the link, while the link bandwidth of the link to the satellite communication node is being determined.

At block 920, the process flow establishes (or opens) the link between with the satellite communication node based on the determined link bandwidth, when the link with the satellite communication nod is authorized and encrypted.

At block 925, the process flow sends a second packet train to dynamically recalculate the link bandwidth to the satellite communication node after the link is established with the satellite communication node.

At block 930, the process flow receives a third packet train from the satellite to determine whether the link bandwidth changed based on the second packet train, where a second link bandwidth is dynamically readjusted when a first timestamp for the second packet train and a second timestamp for the third packet train has changed within a predetermined threshold.

For example, process flow 900 may dynamically calculate the best path between nodes using the DLSP (as shown in FIGS. 1-6). Also note that the process flow 900 as shown in FIG. 9 can include fewer or additional blocks based on the dynamic link state routing protocol, as described herein.

Figure 10:
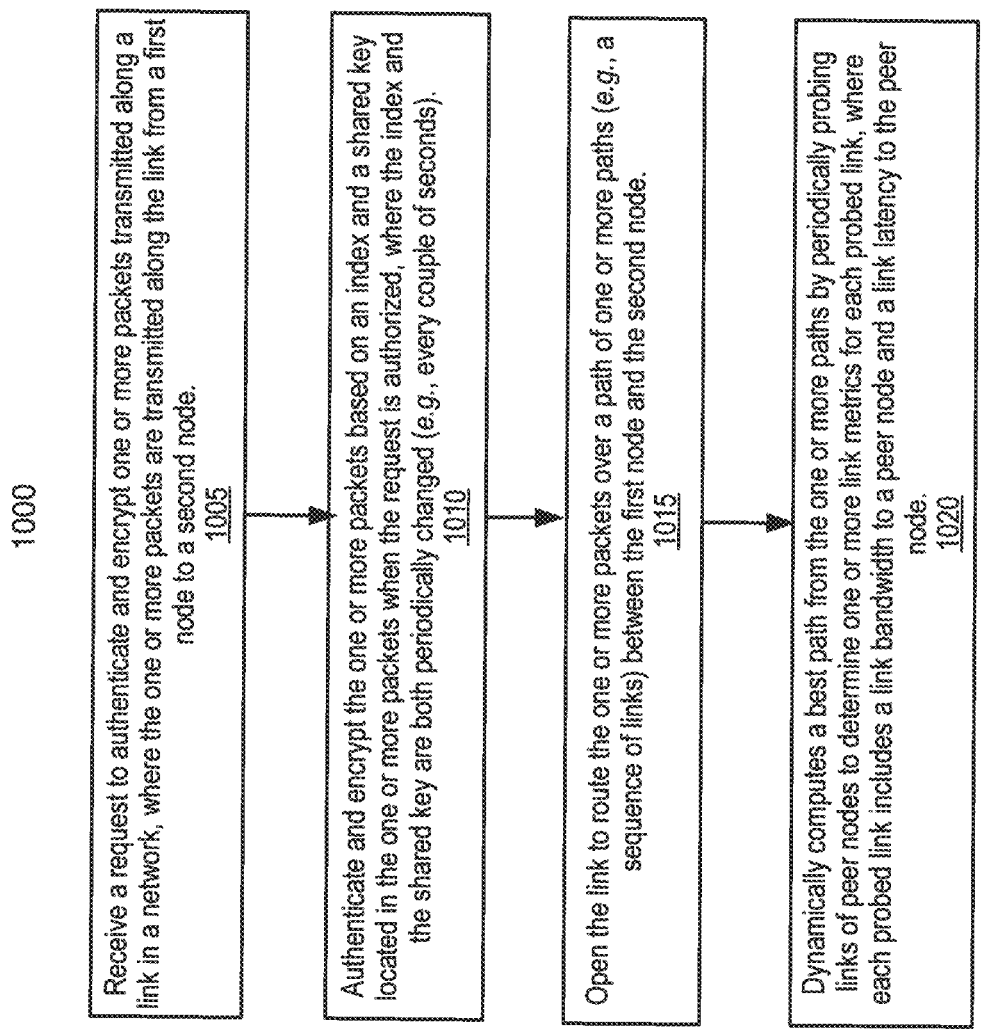
FIG. 10 is a process flow illustrating a method far routing packets in a network using a DLSP system, according to one embodiment.

FIG. 10 is a process flow 10700 illustrating a method for routing packets in a network based on a dynamic link state routing protocol (e.g., the DLSP 215 of FIG. 2). For one embodiment, the process flow 1000 may be implemented in a DLSP system as shown in FIGS. 1-6.

At block 1005, the process flow receives a request to authenticate and encrypt one or more packets transmitted along a link in a network, where the one or more packets are transmitted along the link from a first node to a second node (e.g., as shown in FIGS. 1-6).

At block 1010, if the request is authorized, the process flow authenticates and encrypts the one or more packets based on an index and a shared key that are located in the one or more packets, where the index and the shared key are both periodically changed (e.g., every couple of seconds). Note that the request authorization process can be implemented with the dynamic link state routing protocol (e.g., the DLSP 615 of FIG. 6), as described herein.

At block 1015, the process flow opens the link to route the one or more packets over a path of one or more paths (e.g., a sequence of links) between the first node and the second node.

At block 1020, after the link has been opened, the process flow dynamically computes a best path from the one or more paths by periodically probing links of peer nodes to determine one or more link metrics for each probed link, where each probed link includes a link bandwidth to a peer node and a link latency to the peer node.

For example, process flow 1000 may dynamically calculate the best path between nodes using the DLSP (as shown in FIGS. 1-6). Note that the link bandwidth may refer to the number of packets that can be transferred from the first node to the second node, meanwhile the link latency may refer to the time that a packet takes to travel from the first node to the second node. Also note that the process flow 1000 as shown in FIG. 10 can include fewer or additional blocks based on the dynamic link state routing protocol, as described herein.

Figure 11:
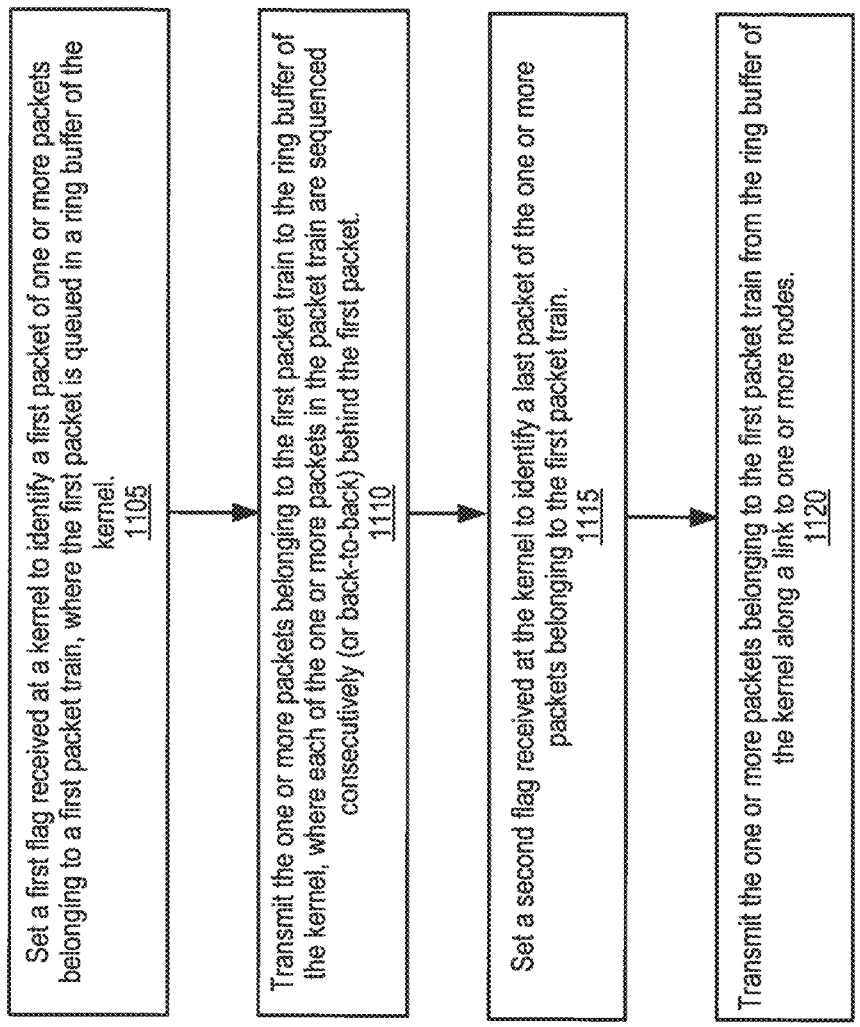
FIG. 11 is a process flow illustrating a method for routing packet trains in a ring buffer of a kernel using a DLSP system, according to one embodiment.

FIG. 11 is a process flow 1100 illustrating a method for routing one or more packets of a packet train in a kernel based on a dynamic link state routing protocol (e.g., the DLSP 215 of FIG. 2). For one embodiment, the process flow 1100 may be implemented in a DLSP system as shown in FIGS. 1-6. In addition, for another embodiment, the process flow 1100 may implement the DLSP protocols implemented at the kernel 620 of FIG. 6.

At block 1105, the process flow sets a first flag received at a kernel to identify a first packet of one or more packets belonging to a first packet train, where the first packet is queued in a ring buffer of the kernel.

At block 1110, the process flow transmits the one or more packets belonging to the first packet train to the ring buffer of the kernel, where each of the one or more packets in the packet train are sequenced consecutively (or back-to-back) behind the first packet.

At block 1115, the process flow sets a second flag received at the kernel to identify a last packet of the one or more packets belonging to the first packet train. For example, when the kernel receives the second flag, the kernel identifies each of the one or more packets belonging to the first packet train, identifies the last packet belonging to the first packet train, and notifies the ring buffer to stop queuing packets for the first packet train. Note that after a first flag is set, a kernel saves the ensuing packets and every other packet belonging to a given packet train in a ring buffer (even if some of the packets are not sent back-to-back).

At block 1120, the process flow transmits the one or more packets belonging to the first packet train from the ring buffer of the kernel along a link to one or more nodes. For example, when the kernel receives the second flag, the kernel forwards the one or more packets belonging to the first packet train from the ring buffer in a consecutively sequenced transmission (or a back-to-back transmission).

For example, process flow 1100 can be used to route the one or more packets in the packet train back-to-back between nodes using the DLSP (as shown in FIGS. 1-6). Note that the process flow 1100 as shown in FIG. 11 can include fewer or additional blocks based on the dynamic link state routing protocol, as described herein.

FIG. 12 illustrates a link state information table 1200 that includes one or more parameters 1201-1209 used in a DLSP system (e.g., DLSP system 200 of FIG. 2). The link state information table 1200 (also referred to as packet header fields) illustrates link state information received by a network device, as described herein.

For some embodiments, a header of a packet received by the network device can have the one or more parameters 1201-1209, including any other information about the packet and/or any other configurable parameter. For example, parameter 1201 can indicate a link number (e.g., L12 to illustrate a link from node 1 to node 2), parameter 1202 can indicate an IP address of a source device, and parameter 1203 can indicate an IP address of a destination device.

For example, parameter 1204 can indicate a link latency of a link (e.g., L12), parameter 1205 can indicate a link bandwidth of the link, parameter 1206 can indicate an error rate along the link, parameter 1207 can indicate a load distribution/ratio (%) on the link, parameter 1208 can indicate a path cost associated with the link, and parameter 1209 can indicate a path hop(s) associated with link.

Moreover, FIG. 12 shows an exemplary data structure stored in a memory containing DLSP information about link states received by the network device, according to some embodiments. The data structure, such as a link state information table 1200, contains information about each link in the network, such as the link from node 1 to node 2 ("L12"). The data structure can have one or more parameters (or fields), such as parameters 1201-1209 and any other configurable parameter. For example, based on the one or more parameters 1201-1209 of the link state information table 1200, the network device can provide multiple paths through the network and dynamically calculate a best path from the multiple paths to get to a destination location. For one embodiment, a routing/mapping policy determines which way to route the packets based on its implemented DLSP For at least some embodiments, the link state information table 1200 can be shown as a hash table. For one embodiment, the network device uses the link state information 1200 to dynamically monitor and reconfigure each link in the network to establish the best path. For example, when the first packets are received at the network device, a session containing a VC path may be created for a packet train to track/obtain what is going through the network device, e.g., how many bytes it received by the device, how many bytes is going out of the device, and the like.

Note that the link state information, as shown in FIG. 12, can be implemented in any of the DLSP systems described herein (e.g., DLSP systems 100, 200, 300, 400, 500 and 600 of FIGS. 1-6). Also note that the link state information table 1200 as shown in FIG. 12 can include fewer or additional parameters based on the configurable DLSP policies, as described herein.

Figure 13:
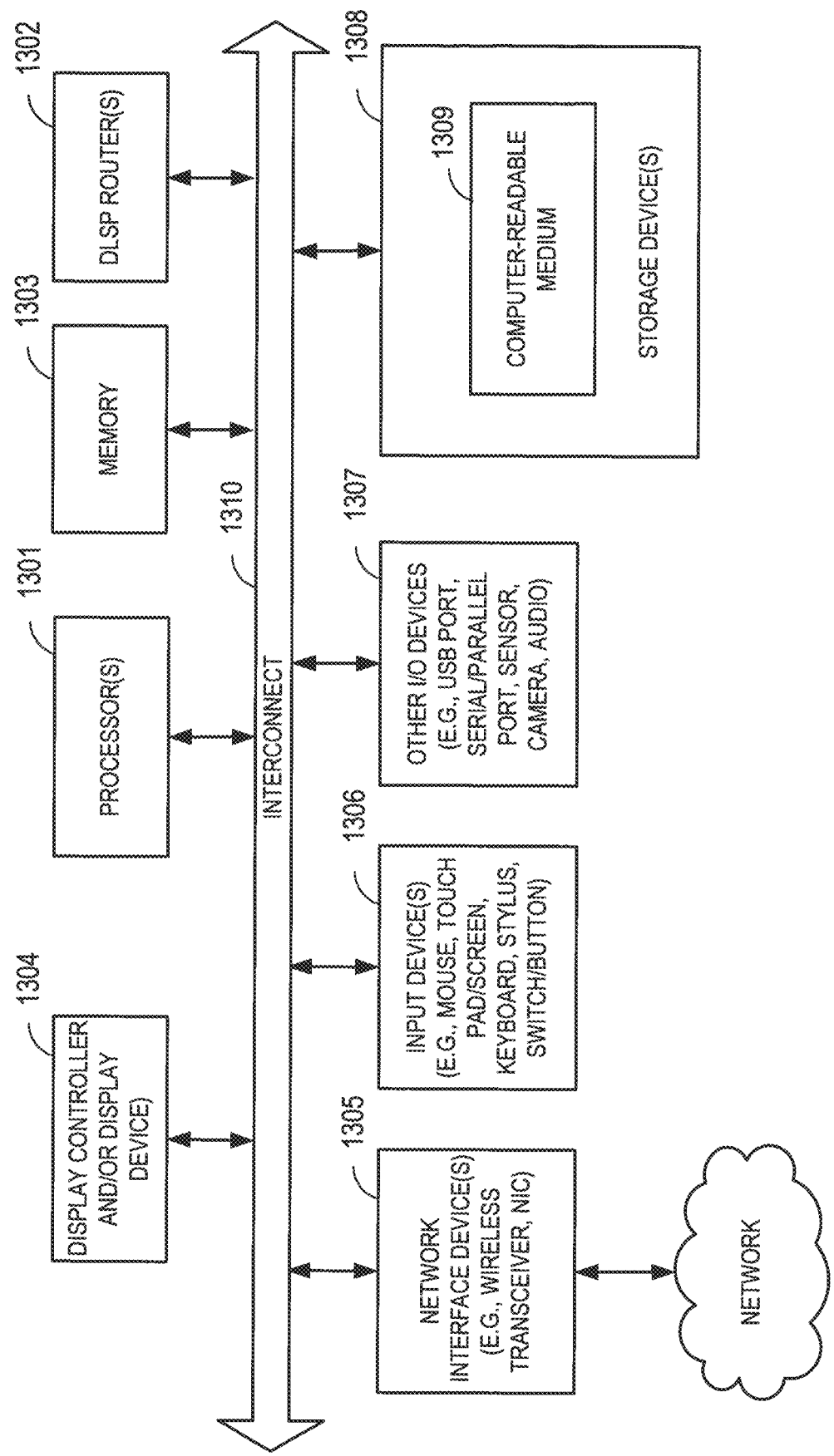
FIG. 13 is a block diagram illustrating a data processing system that utilizes a DLSP system, according to one embodiment.

FIG. 13 is a block diagram illustrating an example of a data processing system 1000 that includes DLSP routers 1302, as described herein. For example, system 1300 may represent a data processing system for performing any of the processes or methods described above in connection with any of FIGS. 1-12. System 1300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1300 is intended to show a high-level view of many components of the computer system. However, it is to be understood that additional components may be present in certain implementations and furthermore, different arrangement of the components shown may occur in other implementations.

System 1300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1300 includes processor 1301, DLSP routers 1302, memory 1303, and devices 1305-1308 via a bus or an interconnect 1310. Processor 1301 may represent a single processor or multiple processors with a single processor core or multiple processor cores included therein. Processor 1301 may represent one or more general-purpose processors such as a microprocessor, a central processing unit (CPU), or the like. More particularly, processor 1301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1301, which may be a low power multi-core processor socket such as an ultra-low voltage processor, may act as a main processing unit and central hub for communication with the various components of the system. Such processor can be implemented as a system on chip (SoC). Processor 1301 is configured to execute instructions for performing the operations and/or steps discussed herein. System 1300 may further include a graphics interface that communicates with optional graphics subsystem 1304, which may include a display controller, a graphics processor, and/or a display device.

Processor 1301 may communicate with DSP routers 1302 and memory 1303, which in one embodiment can be implemented via multiple memory devices to provide for a given amount of system memory that incorporates one or more DLSP-enabled routing protocols via a DLSP system (e.g., DLSP systems 100, 200, 300, 400, and 500 of FIGS. 1-5). Memory 1303 may include one or more volatile storage (or memory) devices such as random access memory (RAM), dynamic RAM (DRAM), synchronous DRAM (SDRAM), static RAM (SRAM), or other types of storage devices. Memory 1303 may store information including sequences of instructions that are executed by processor 1301 or any other device. For example, executable code and/or data of a variety of operating systems, device drivers, firmware (e.g., input output basic system or BIOS), and/or applications can be loaded in memory 1303 and executed by processor 1301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1300 may further include I/O devices such as devices 1305-1308, including network interface device(s) 1305, optional input device(s) 1306, and other optional IO device(s) 1307. Network interface device 1305 may include a wireless transceiver and or a network interface card (NIC). The wireless transceiver may be a Wi-Fi transceiver, an infrared transceiver, a Bluetooth transceiver, a WiMax transceiver, a wireless panel assembly telephony transceiver, a satellite transceiver (e.g., a global positioning system (GPS) transceiver), or other radio frequency (RF) transceivers, or a combination thereof. The NIC may be an Ethernet card.

Input device(s) 1306 may include a mouse, a touch pad, a touch sensitive screen (which may be integrated with display device 1304), a pointer device such as a stylus, and/or a keyboard (e.g., physical keyboard or a virtual keyboard displayed as part of a touch sensitive screen). For example, input device 1306 may include a touch screen controller coupled to a touch screen. The touch screen and touch screen controller can, for example, detect contact and movement or a break thereof using any of multiple touch sensitivity technologies, including but not limited to capacitive, resistive, infrared, and surface acoustic wave technologies, as well as other proximity sensor arrays or other elements for determining one or more points of contact with the touch screen.

I/O devices 1307 may include an audio device. An audio device may include a speaker and/or a microphone to facilitate voice-enabled functions, such as voice recognition, voice replication, digital recording, and/or telephony functions. Other 10 devices 1307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1310 via a sensor hub (not shown), while other devices such as a keyboard or thermal sensor may be controlled by an embedded controller (not shown), dependent upon the specific configuration or design of system 1300.

To provide for persistent storage of information such as data, applications, one or more operating systems and so forth, a mass storage (not shown) may also couple to processor 1301. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1301, e.g., via a serial peripheral interface (SPI). This flash device may provide for non-volatile storage of system software, including a basic input/output software (BIOS) as well as other firmware of the system.

Storage device 1308 may include computer-accessible storage medium 1309 (also known as a machine-readable storage medium or a computer-readable medium) on which is stored one or more sets of instructions or software embodying any one or more of the methodologies or functions described herein. Embodiments described herein (e.g., the process flows 700, 800, 900, 1000, and 1100 described above in connection with FIGS. 7-11) may also reside, completely or at least partially, within memory 1303, with DLSP routers 1302, and/or within processor 1301 during execution thereof by data processing system 1300, memory 1303, DLSP routers 1302, and processor 1301 also constituting machine-accessible storage media. Modules, units, or logic configured to implement the embodiments described herein (e.g., the process flows 700, 800, 900, 1000, and 110 described above in connection with FIGS. 7-11) may further be transmitted or received over a network via network interface device 1305.

Computer-readable storage medium 1309 may also be used to store some software functionalities described above persistently. While computer-readable storage medium 1309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the embodiments described herein. The term "computer-readable storage medium" shall accordingly be taken to include, but not be limited to, solid-state memories, and optical and magnetic media, or any other non-transitory machine-readable medium.

The DLSP router 1302 is a network device that forwards data between endpoint devices, for example, a router, gateway, or a switch. Additional components, not shown, are a part of the data processing system 1300. For example, one embodiment of the data processing system 1300 includes port adapters or other modular interface controllers that contain circuitry to transmit and receive packets on physical media.

Note that while FIG. 13 illustrates various components of a computer system, it will be appreciated that network computers and other data processing systems which have fewer components or perhaps more components may also be used with the embodiments as described herein.

Generally, a network refers to a collection of computers and other hardware components interconnected to share resources and information. Networks may be classified according to a wide variety of characteristics, such as the medium used to transport the data, communications protocol used, scale, topology, and organizational scope. Communications protocols define the rules and data formats for exchanging information in a computer network, and provide the basis for network programming. Well-known communications protocols include Ethernet, a hardware and link layer standard that is ubiquitous in local area networks, and the IP suite, which define a set of protocols for internetworking, i.e., for data communication between multiple networks or host-to-host data transfer, including TCP, UDP, and application-specific data transmission formats (e.g., HTTP). Methods and apparatuses described herein can be used for any of networks, protocols, and data formats. Also note that each of the DLSP enabled nodes, such as router 105 of FIG. 1, comprises a memory, and a processing unit coupled to the memory to perform DLSP methods as described herein.

Note that while system 1300 is illustrated with various components of a data processing system, it is not intended to represent any particular architecture or manner of interconnecting the components; as such, details are not germane to embodiments described herein. It will also be appreciated that network computers, handheld computers, mobile phones, servers, and/or other data processing systems, which have fewer components or perhaps more components, may also be used with embodiments described herein.

In the foregoing specification, embodiments have been described with reference to specific exemplary embodiments thereof. It will be evident that various modifications may be made thereto without departing from the broader spirit and scope. The specification and drawings are, accordingly, to be regarded in an illustrative sense rather than a restrictive sense,

What is claimed is:

1. A method for routing packets on a network, comprising:
dynamically computing a best path from one or more paths by periodically probing links of peer nodes to determine one or more link metrics associated with a link, wherein the one or more link metrics include a link bandwidth to a peer node and a link latency to the peer node, wherein the best path from the one or more paths is dynamically computed using the link bandwidth to the peer node and the link latency to the peer node;
receiving a request to authenticate and encrypt one or more packets transmitted along the link, wherein the one or more packets are transmitted from a first node to a second node;
authenticating and encrypting the one or more packets based on an index and a shared key located in the one or more packets, wherein the index and the shared key are both periodically changed, and wherein the one or more packets are not authenticated and encrypted when the request is not authorized; and
opening the link for routing the one or more packets between the first node and the second node, wherein the link is associated with the one or more paths in the network.

2. The method of claim 1, wherein the link bandwidth to the peer node further includes at least one of a maximum bandwidth and an available bandwidth.

3. The method of claim 1, wherein the one or more link metrics further include at least one of an error rate, a load ratio, a path cost, and a path hop.

4. The method of claim 1, wherein the link latency further includes at least one of a ping transmission, a synchronization transmission, and a running average time between nodes.

5. The method of claim 4, wherein the ping transmission further comprises measuring a first timestamp indicating when an initial packet is transmitted to a peer node; and measuring a second timestamp indicating when the initial packet is received by the peer node.

6. The method of claim 5, wherein the running average time between the nodes is determined by adding the first timestamp and the second timestamp, and then dividing the added first and second timestamps in half.

7. The method of claim 4, wherein the synchronization transmission further comprises dynamically computing a one-way latency to the peer node by sending out a single latency probe that has a first timestamp; determining a second timestamp of an incoming packet from the peer node, wherein the peer node sends the incoming packet in response to the single latency probe; and determining the one-way latency to the peer node based on the first timestamp and the second timestamp.

8. The method of claim 1, wherein each of the peer nodes includes at least one of a kernel, a ring buffer, and a forwarding engine.

9. The method of claim 8, wherein the forwarding engine receives one or more notifications including a total number of available paths, a plurality of reachable networks, and one or more router addresses associated with one or more incoming packets.

10. The method of claim 1, wherein each of the peer nodes includes one or more information tables, and wherein the one or more information tables include at least one of an interface table, a load distribution table, and an anchor table.

11. The method of claim 1, wherein each of the peer nodes includes one or more configurable policies, including a priority-based policy, a path latency policy, a path bandwidth policy, a path bandwidth and latency policy, and a path capacity policy.

12. The method of claim 1, wherein each of the peer nodes is associated with at least one or more sessions used to transmit packets between nodes.

13. The method of claim 12, wherein each of the sessions is mapped to a given path based on one or more session policies.

14. The method of claim 13, wherein the one or more session policies further comprise using a full bandwidth prior to sending the packets in the session; selecting a least congested path to transmit the packets in the session; sending one more additional packets over an expected flow; determining whether a congestion threshold is reached; and mapping a second session for a second-best path when the threshold is reached.

15. The method of claim 12, wherein each session is embedded with information that frequently changes the index and the shared key in a predetermined time interval, and wherein the embedded information synchronizes each of the nodes in the session by identifying an authorized shared key from a plurality of shared keys based on an index timestamp.

16. The method of claim 1, wherein an initial long packet train is used to determine the best path, and wherein the long packet train establishes the best path based on an inter-packet gap time between the nodes and a total number of packets received by the nodes.

17. A method for routing packets on a network, comprising:

dynamically computing a best path from one or more paths by periodically probing links of peer nodes to determine one or more link metrics associated with a link, wherein the one or more link metrics include a link bandwidth to a peer node and a link latency to the peer node, wherein the best path from the one or more paths is dynamically computed using the link bandwidth to the peer node and the link latency to the peer node dynamically recalculating the one or more link metrics associated with the link every 10 seconds;

monitoring one or more link state changes based on the one or more link metrics, wherein the link state changes are monitored every 60 seconds; and determining a single link metric based on the link bandwidth to the peer node and the link latency to the peer node.

18. A router for routing packets on a multipath network, comprising:

a memory; and a processing unit coupled to the memory, wherein the processing unit:

determines one or more links associated with one or more paths, wherein each of the one or more links transmits one or more packets between peer nodes;

dynamically computes a best path from the one or more paths by periodically probing the one or more links of the peer nodes; and determines one or more link metrics associated with each of the one or more probed links, wherein the one or more link metrics include a link bandwidth to a peer node and a link latency to the peer node, wherein the best path from the one or more paths is dynamically computed using the link bandwidth to the peer node and the link latency to the peer node, wherein a request is received to authenticate and encrypt one or more packets transmitted along the link, wherein the one or more packets are transmitted from a first node to a second node; the one or more packets are authenticated and encrypted based on an index and a shared key located in the one or more packets, wherein the index and the shared key are both periodically changed, and wherein the one or more packets are not authenticated and encrypted when the request is not authorized; and the link for routing the one or more packets is opened between the first node and the second node, wherein the link is associated with the one or more paths in the network.

19. The router of claim 18, wherein the link bandwidth to the peer node further includes at least one of a maximum bandwidth and an available bandwidth.

20. The router of claim 18, wherein the one or more link metrics further include at least one of an error rate, a load ratio, a path cost, and a path hop.

21. The router of claim 18, wherein the link latency further includes at least one of a ping transmission, a synchronization transmission, and a running average time between nodes.

22. The router of claim 21, wherein the ping transmission further comprises measuring a first timestamp indicating when an initial packet is transmitted to a peer node; and measuring a second timestamp indicating when the initial packet is received by the peer node.

23. The router of claim 22, wherein the running average time between the nodes is determined by adding the first timestamp and the second timestamp, and then dividing the added first and second timestamps in half.

24. The router of claim 21, wherein the synchronization transmission further comprises:

a one-way latency to the peer node that is dynamically computed by sending out a single latency probe that has a first timestamp;

a second timestamp of an incoming packet that is determined from the peer node, wherein the peer node sends the incoming packet in response to the single latency probe; and the one-way latency to the peer node is determined based on the first timestamp and the second timestamp.

25. The router of claim 18, wherein each of the peer nodes includes at least one of a kernel, a ring buffer, and a forwarding engine.

26. The router of claim 25, wherein the forwarding engine receives one or more notifications including a total number of available paths, a plurality of reachable networks, and one or more router addresses associated with one or more incoming packets.

27. The router of claim 18, wherein each of the peer nodes includes one or more information tables, and wherein the one or more information tables include at least one of an interface table, a load distribution table, and an anchor table.

28. The router of claim 18, wherein each of the peer nodes includes one or more configurable policies, including a priority-based policy, a path latency policy, a path bandwidth policy, a path bandwidth and latency policy, and a path capacity policy.

29. The router of claim 18, wherein each of the peer nodes is associated with at least one or more sessions used to transmit packets between nodes.

30. The router of claim 29, wherein each of the sessions is mapped to a given path based on one or more session policies.

31. The router of claim 30, wherein the one or more session policies further comprise using a full bandwidth prior to sending the packets in the session; selecting a least congested path to transmit the packets in the session; sending one more additional packets over an expected flow; determining whether a congestion threshold is reached; and mapping a second session for a second-best path when the threshold is reached.

32. The router of claim 29, wherein each session is embedded with information that frequently changes the index and the shared key in a predetermined time interval, and wherein the embedded information synchronizes each of the nodes in the session by identifying an authorized shared key from a plurality of shared keys based on an index timestamp.

33. The router of claim 18, wherein an initial long packet train is used to determine the best path, and wherein the long packet train establishes the best path based on an inter-packet gap time between the nodes and a total number of packets received by the nodes.

34. A router for routing packets on a multipath network, comprising:
a memory; and
a processing unit coupled to the memory, wherein the processing unit:
determines one or more links associated with one or more paths, wherein each of the one or more links transmits one or more packets between peer nodes;
dynamically computes a best path from the one or more paths by periodically probing the one or more links of the peer nodes; and
determines one or more link metrics associated with each of the one or more probed links, wherein the one or more link metrics include a link bandwidth to a peer node and a link latency to the peer node, wherein the best path from the one or more paths is dynamically computed using the link bandwidth to the peer node and the link latency to the peer node, wherein
the one or more link metrics associated with the link are dynamically recalculated every 10 seconds;
one or more link state changes are monitored based on the one or more link metrics, wherein the link state changes are monitored every 60 seconds; and
a single link metric is determined based on the link bandwidth to the peer node and the link latency to the peer node.

35. A method for routing packets on a multipath network, comprising:
determining one or more links associated with one or more paths, wherein each of the one or more links transmits one or more packets between peer nodes;
dynamically computing a best path from the one or more paths by periodically probing the one or more links of the peer nodes; and
determining one or more link metrics associated with each of the one or more probed links, wherein the one or more link metrics include a link bandwidth to a peer node and a link latency to the peer node, wherein the best path from the one or more paths is dynamically computed using the link bandwidth to the peer node and the link latency to the peer node,
receiving a request to authenticate and encrypt one or more packets transmitted along the link, wherein the one or more packets are transmitted from a first node to a second node;
authenticating and encrypting the one or more packets based on an index and a shared key located in the one or more packets, wherein the index and the shared key are both periodically changed, and wherein the one or more packets are not authenticated and encrypted when the request is not authorized; and
opening the link for routing the one or more packets between the first node and the second node, wherein the link is associated with the one or more paths in the network.

36. The method of claim 35, wherein the link bandwidth to the peer node further includes at least one of a maximum bandwidth and an available bandwidth; and wherein the one or more link metrics further include at least one of an error rate, a load ratio, a path cost, and a path hop.

37. A method for routing packets on a multipath network, comprising:
determining one or more links associated with one or more paths, wherein each of the one or more links transmits one or more packets between peer nodes;
dynamically computing a best path from the one or more paths by periodically probing the one or more links of the peer nodes; and
determining one or more link metrics associated with each of the one or more probed links, wherein the one or more link metrics include a link bandwidth to a peer node and a link latency to the peer node, wherein the best path from the one or more paths is dynamically computed using the link bandwidth to the peer node and the link latency to the peer node;
dynamically recalculating the one or more link metrics associated with the link every 10 seconds;
monitoring one or more link state changes based on the one or more link metrics, wherein the link state changes are monitored every 60 seconds; and
determining a single link metric based on the link bandwidth to the peer node and the link latency to the peer node.

* * * * *